United States Patent [19]
Oaks

[11] Patent Number: 5,123,610
[45] Date of Patent: * Jun. 23, 1992

[54] RETROFIT DIGITAL ELECTRONICS UNIT FOR A TUBE-LAUNCHED MISSILE

[75] Inventor: Richard W. Oaks, Tucson, Ariz.

[73] Assignee: Hughes Aircraft Company, Los Angeles, Calif.

[*] Notice: The portion of the term of this patent subsequent to Jan. 21, 2009 has been disclaimed.

[21] Appl. No.: 384,229

[22] Filed: Jul. 21, 1989

[51] Int. Cl.⁵ .............................................. F41G 7/00
[52] U.S. Cl. .................................. 244/3.12; 244/3.11
[58] Field of Search ................... 244/3.1, 3.12, 3.13, 244/3.14, 3.21, 3.11

[56] References Cited

U.S. PATENT DOCUMENTS

| | | | |
|---|---|---|---|
| 4,037,202 | 7/1977 | Terzian | 364/200 |
| 4,662,580 | 5/1987 | Nelson | 244/3.21 |
| 4,899,956 | 2/1990 | King et al. | 244/3.21 |

Primary Examiner—Brian S. Steinberger
Attorney, Agent, or Firm—R. M. Heald; C. D. Brown; W. K. Denson-Low

[57] ABSTRACT

A retrofit digital electronics unit replaces the analog electronics unit of a tube-launched optically-tracked wire-guided missile. The retrofit digital electronics unit is smaller in size permitting the warhead of the missile to be enlarged. Additionally, the retrofit digital electronics unit is more susceptible to modification through simple changes in software.

8 Claims, 6 Drawing Sheets

RETROFIT DIGITAL ELECTRONICS UNIT FOR A TUBE-LAUNCHED MISSILE

RELATED INVENTIONS

Applicant acknowledges copending application Ser. No. 07/384,228 filed Jul. 21, 1989 and assigned to the same assignee as the present invention.

BACKGROUND OF THE INVENTION

1. Field of the Invention:

This invention relates generally to the tube-launched optically-tracked wire-guided family of missiles and more specifically to a retrofit electronics unit therefore.

2. Description of Related Art:

These types of missiles were first developed over a decade ago and have proven themselves as very effective weapon against such targets as tanks, personnel carriers, bunkers, and the like.

A large part of these missile's effectiveness and appeal is its simple operational concept. The operator of the missile "guides" the missile to the target. Communication with the missile is through a wire or fiber optic link. Using a telescope and cross hairs arrangement, the operator controls the line of sight flight path of the missile to avoid field obstructions such as trees or hills. Since the operator controls the line of flight, a great operational burden is removed from the missile; it doesn't require the high level of electronic "brains" or complexity of other missiles. This reduces the cost of the missile significantly.

These operator generated signals are communicated in analog form utilizing changes in frequency in the communication link (a pair of thin steel wires). Because the incoming signal is analog, the electronics unit is also analog which makes the electronics unit bulky and complex.

One major disadvantage associated with analog circuits, is that even simple modification of the circuit's objective or operation is extremely difficult, requiring almost a total re-engineering of the circuit. This prevents the engineers from "fine tuning" the electronics unit.

The electronics unit is the "brains" of these missiles and implements the commands of the operator by adjusting the pitch and yaw control surfaces. These control surfaces guide the missile.

The various components making the missile (i.e. the warhead, the electronics unit, the flight motor, the launch motor, etc.) are unique separate modules permitting the missile to not only be easily maintained, but also component upgraded without undue re-engineering of the entire system.

The electronics unit is typically positioned directly behind the warhead in a forward position on the missile. The presence of the bulky electronics directly behind the warhead unit limits the volume available for the warhead. For some applications or targets, the limited size of the warhead is a disadvantage.

It is clear from the forgoing that the present analog electronics unit creates many engineering problems which hinders the ready upgrade of the tube-launched missiles.

SUMMARY OF THE INVENTION

The present invention replaces the purely analog electronics unit of the tube-launched missile with a hybrid analog/digital electronics unit.

The replacement electronics unit attaches to the existing wire harness and fits into the cavity created by removal of the traditional electronics unit. This hybrid electronics unit permits not only easy modification (through software changes to the digital micro-controller) but reduces the size of the electronics unit to such an extent that the size of the warhead can be significantly increased providing a more powerful and effective missile.

The hybrid electronics unit of the present invention utilizes the analog signals from the operator together with the missile's own internal positional signals generated by the yaw and roll gyros to manipulate the yaw and pitch control surfaces.

All signals received by the replacement electronics unit and sent out by it, are communicated through the traditional wire harness. This characteristic eliminates any undue modification to the missile and permits the missile to be easily retrofitted with the replacement electronics unit.

Any subsequent engineering changes to the electronic "brains" are easily accomplished by simply modifying the internal software of the digital microprocessor.

DESCRIPTION OF THE PREFERRED EMBODIMENTS

Figure 1:
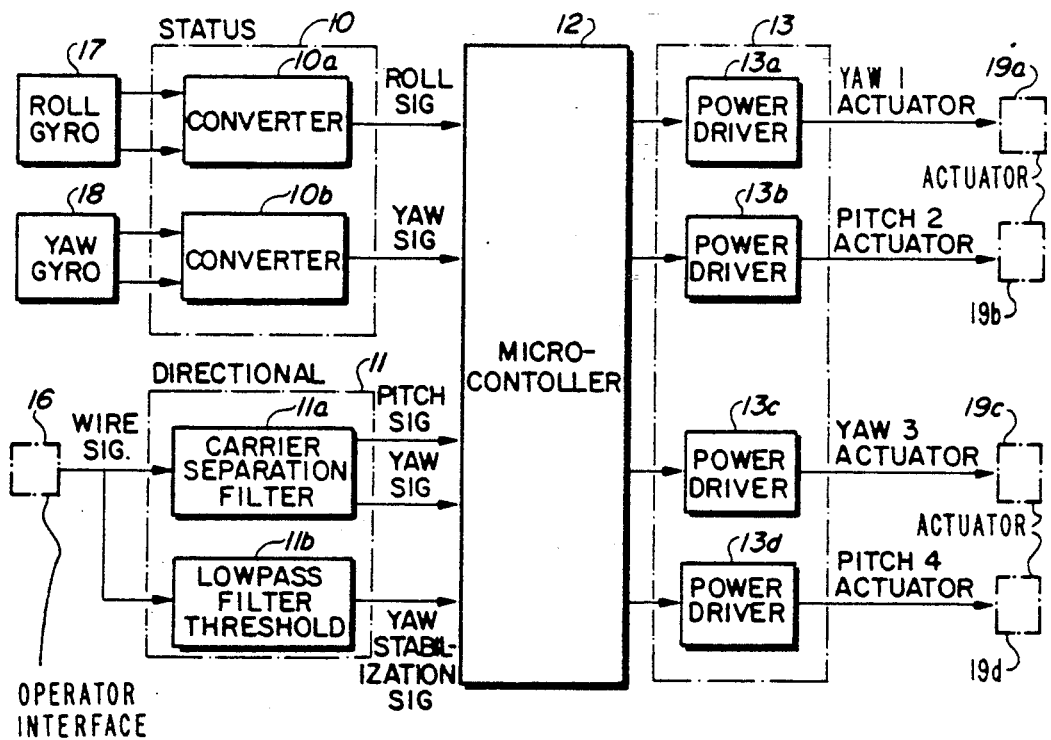
FIG. 1 is a functional block diagram of the preferred embodiment.

FIG. 1 illustrates, in block form, the operation of the preferred embodiment of this invention. At the center of the operation is the micro-controller 12. Utilizing it's software, the micro-controller 12 is the "brains" of the operation.

In this capacity, the micro-controller must be cognizant of the missile's positional status. This information is derived by utilizing the signals from roll gyro 17 and the yaw gyro 18 received from the wire harness (not shown).

The positional status mechanism 10 utilizes these signals for the generation of the roll signal and the yaw signal which are used by the micro-controller 12. By taking the signal from the roll gyro 17 and converting it via converter 10a into the roll signal, and taking the signal from the yaw gyro 18 and converting it via converter 10b into the yaw signal, the proper information is available to the micro-controller 12.

Information as to the operator's instructions/directions are communicated to the micro-controller 12 via the directional mechanism 11.

The operator feeds in the desired directions into operator interface 16. This directional information is communicated via a communication link (not shown) to the directional mechanism 11. The communication link used for these missiles is a continuous physical link (i.e. steel wire, copper wire, fiber optics, or the like) between the operator interface 16 and the missile.

In this regard, directions from the operator are translated by the launcher into the proper signals indicating if the missile is on track or not. For purposes of this description, the operator generated signals are these translated signals.

Since the communication link is a single pair of wires, the analog signal from the operator must be broken into its component parts by the directional mechanism 11. This is done by taking the incoming signal and passing it through a carrier separation filter 11a which generates the pitch signal and the yaw signal used by the micro-controller 12.

A low pass filter with negative threshold 11b obtains the yaw stabilization signal.

Utilizing this information from the status mechanism 10 (roll signal and yaw signal), and the directional mechanism 11 (pitch signal, yaw signal, and yaw stabilization signal), the micro-controller 12 is capable of manipulating the missile through signals sent to the manipulation mechanism 13.

Manipulation mechanism 13 amplifies the signals from the micro-controller 12 and communicates the amplified signals to the proper actuators. In the preferred embodiment, the actuators manipulate the control surfaces to affect the pitch and yaw of the missile in flight through the release of pressurized helium.

Operationally, micro-controller 12 communicates four signals which pass through: Power Driver 13a to generate the Yaw 1 Actuator Signal manipulating Actuator 19a; Power Driver 13b to generate the Pitch 2 Actuator Signal manipulating Actuator 19b; Power Driver 13c to generate the Yaw 3 Actuator Signal manipulating Actuator 19c; Power Driver 13d to generate the Pitch 4 Actuator Signal manipulating Actuator 19d. These power drivers are simply the preferred mechanism as means for amplifying the signals.

In this manner, the objectives of the operator are quickly and easily translated into their proper sequence of missile manipulations.

Figure 2:
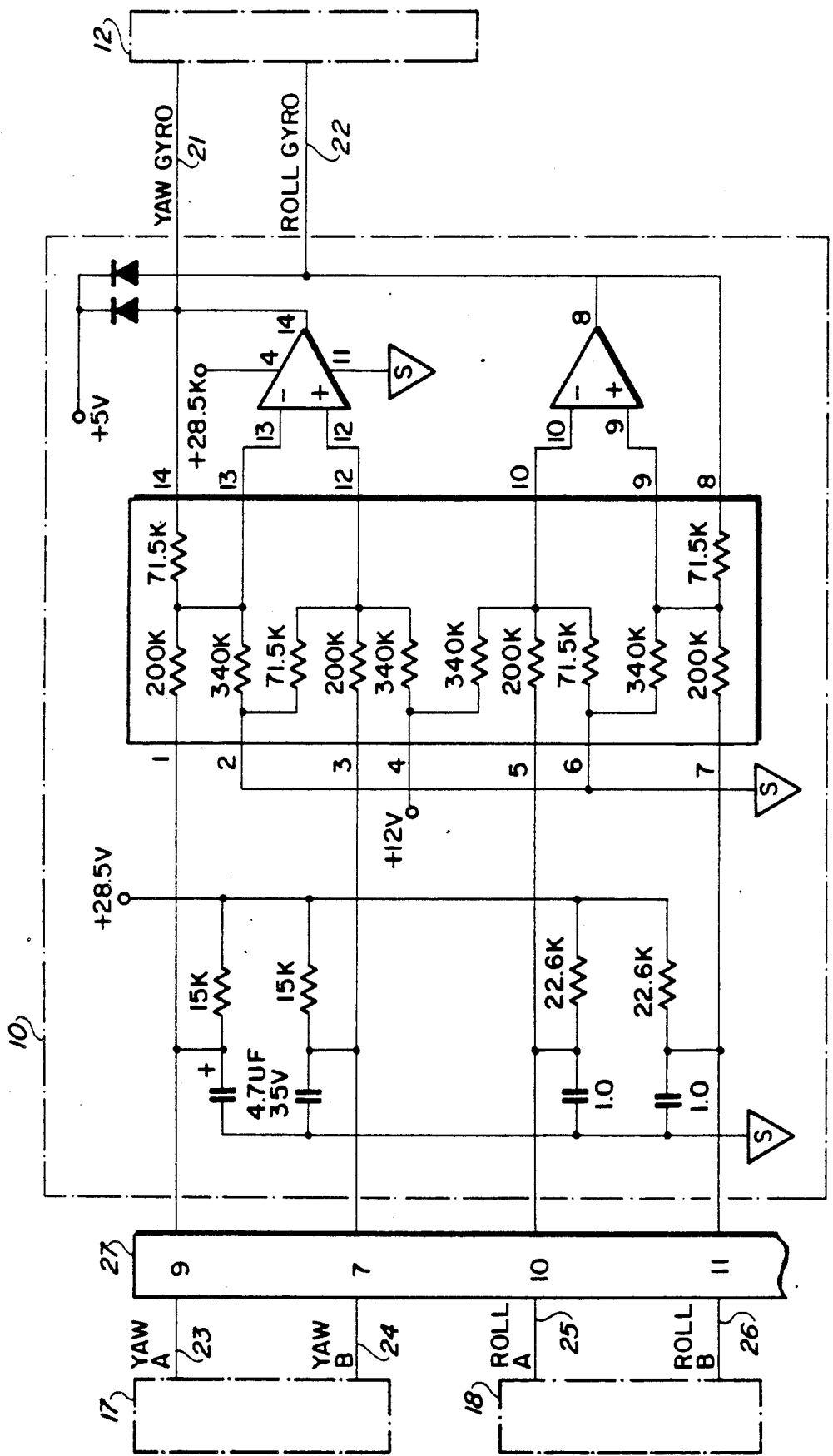
FIG. 2 is an electronic schematic of the positional status determination mechanism first described in FIG. 1.

FIG. 2 is an electronic schematic of the preferred embodiment of the status mechanism first described relative to FIG. 1.

Signals from the roll gyro 17 and the yaw gyro 18 are communicated to the positional status mechanism 10. Those of ordinary skill in the art readily recognize various gyros which may be used in this context.

Signals from the yaw gyro 17 and the roll gyro 18 are communicated to the status mechanism 10 via connector 27. The yaw gyro signal-A 23, the yaw gyro signal-B 24, the roll gyro signal-A 25, and the roll gyro signal-B 26, are manipulated and a yaw gyro signal 21 and roll gyro signal 22 are communicated to the micro-controller 12.

Figure 3:
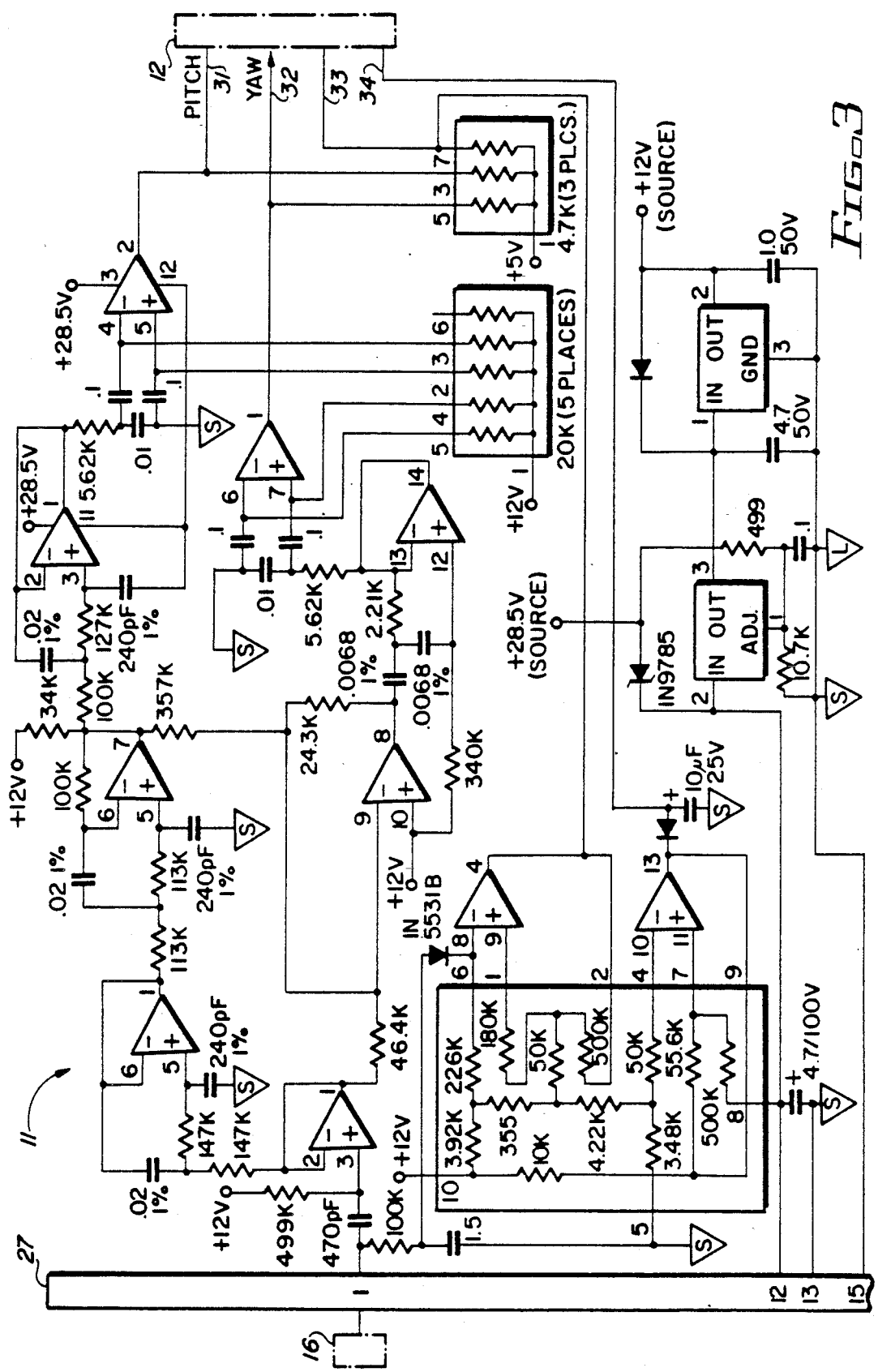
FIG. 3 is an electronic schematic of the decoding circuit for the operator generated signal first described in FIG. 1.

FIG. 3 illustrates the preferred embodiment of the circuit used to create the directional mechanism 11 which accepts the signals indicative of the operator's directions via the operator interface 16 (shown in FIG. 1).

The wire signals from the operator interface 16 are handled by two substantially independent circuits to establish the pitch signal 31 and the yaw signal 32. Control signals 33 and 34 are also communicated to the micro-controller 12.

Figure 4:
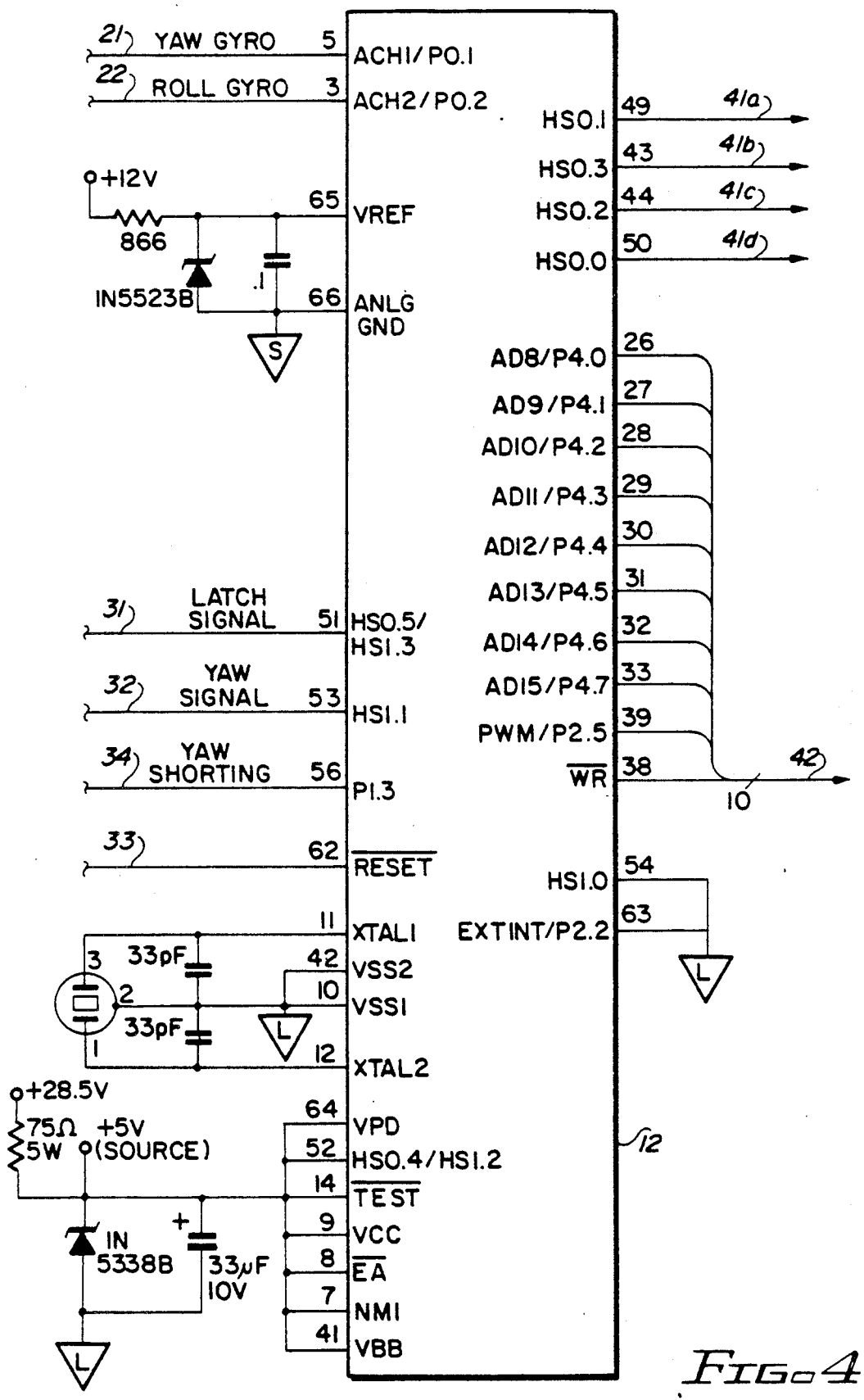
FIG. 4 is a wiring diagram of the micro-controller first described in FIG. 1.

FIG. 4 illustrates the use of the signals from the positional status mechanism 10 and the directional mechanism 11 by the micro-controller 12. The yaw gyro signal 21 and the roll gyro signal 22 (as illustrated in FIG. 2), pitch signal 31, yaw signal 32, and yaw shorting signal 34 (as illustrated in FIG. 3) are combined within the micro-controller 12 to generate the control signals 41a, 41b, 41c, 41d, and 41e; also generated is control signal 42.

In this manner, the positional status of the missile is combined with the directions from the operator for proper manipulation of the missile in flight.

Through software, micro-controller 12 determines when a "first motion" occurs. Launch of the missile determines when micro-controller 12 can manipulate the missile's flight. First motion is determined by observing the pitch control signal from the launcher. Those of ordinary skill in the art recognize several embodiments that accomplish this task.

In the preferred embodiment, the micro-controller 12 is a microprocessor, part number 8797 BH, commercially available from Intel Corporation. Stored within the micro-controller 12 is the software designed to manipulate the incoming signals and perform the correct function. The preferred embodiment for this software is illustrated in the following Table A and is written in Macro Assembly for the Intel 8797 BH.

TABLE A

```
_$1$DJA2:[FLOREZ]TOWVER5.A96;1

$ SYMBOLS EP XREF PL(82) PW(128) TITLE(    Missile Tactical Software")

;       Missile Tactical Software ( MTS) version 5.0 for Retrofit DEU
;
; The following is a program listing of the    Missile Tactical Software.
; This program was written for the intel 8x97 microcontroller to be used in
; the     missile Retrofit Digital Electronics Unit (RDEU).  The program
; consists of a main routine, called INIT, and three interrupt service routines
; HSI_D_A, AD_CONVR, and SWTIM.  A complete description of the functions this
; program performs can be found in the Computer Program Development Spec-
; ification (mis-39483) and in the Computer Program Product Specification
; (mis-39484).
;
;;;;;;;;;;;;;;;;;;;;;;;;;;;;;;;;;;;;;;;;;;;;;;;;;;;;;;;;;;;;;;;;;;;;;;;;;

INIT         MODULE    MAIN, STACKSIZE(30)
; DATE LAST MODIFIED 12/20/88

; This routine initializes all critical registers and sets up the micro-
; processor to handle the     missile signals.  It also starts the gyro
; sampling process.  After all initializing is done the routine settles
; into an idle loop where it waits for an interrupt to occur.
;
; Attached to this module is an error code which does nothing more than
; return unexpected stray interrupts back to their sources.
;
;;;;;;;;;;;;;;;;;;;;;;;;;;;;;;;;;;;;;;;;;;;;;;;;;;;;;;;;;;;;;;;;;;;;;;;;;

;;;;;;;;;;;;;;;;;;;     Special Function Registers   ;;;;;;;;;;;;;;;;;;;;
;;;;;;;;;;;;;;;;;;;          and I/O Ports           ;;;;;;;;;;;;;;;;;;;;
                                                                        ;
        ZERO              SET     000H    :word        ; R/W           ;
                                                                        ;
        AD_COMMAND        SET     002H    :byte        ;   W           ;
        AD_RESULT_lo      SET     002H    :byte        ; R             ;
        AD_RESULT_hi      SET     003H    :byte        ; R             ;
        HSI_MODE          SET     003H    :byte        ;   W           ;
        HSO_TIME          SET     004H    :word        ;   W           ;
        HSI_TIME          SET     004H    :word        ; R             ;
        HSO_COMMAND       SET     006H    :byte        ;   W           ;
        HSI_STATUS        SET     006H    :byte        ; R             ;
                                                                        ;
        INT_MASK          SET     008H    :byte        ; R/W           ;
        INT_PENDING       SET     009H    :byte        ; R/W           ;
        TIMER1            SET     00AH    :word        ; R             ;
                                                                        ;
        IOPORT1           SET     00FH    :byte        ;   W           ;
        IOPORT2           SET     010H    :byte        ; R/W           ;
                                                                        ;
        IOS0              SET     015H    :byte        ; R             ;
        IOC0              SET     015H    :byte        ;   W           ;
        IOS1              SET     016H    :byte        ; R             ;
        IOC1              SET     016H    :byte        ;   W           ;
                                                                        ;
        SP                SET     018H    :word        ; R/W           ;
                                                                        ;
        ;;;;;;;;;;;;;;;;;;;;;;;;;;;;;;;;;;;;;;;;;;;;;;;;;;;;;;;;;;;;;;;;

;;;;;;;;;;;;;;;;;;;;;;;;;;;      User Defined Registers   ;;;;;;;;;;;;;;;;;;;;;;
;;;;;;;;;;;;;;;;;;;;;;;;;;;          Program variables    ;;;;;;;;;;;;;;;;;;;;;;
;                                                                              ;
; A description of the following variables including: set by, used by, and     ;
; initial values can be found in the Computer Program Product Specification    ;
; (mis-39484).                                                                 ;
                                                                                ;
RSEG     at     1AH                                                            ;
                                                                                ;
         BALANCE_IMAGE_WO:  DSW    1    ; Used in writing to the balance       ;
                                        ; D/A converter                         ;
; Pointer to the high order byte of BALANCE_IMAGE_WO                            ;
         BALANCE_IMAGE      EQU    BALANCE_IMAGE_WO+1:byte  ; (overlap)         ;
```

```
        IOS1_IMAGE:         DSB     1       ; Image of IOS1 register
        HSI_STATUS_IMAGE:   DSB     1       ; Image of HSI status register FLAGSET1:           DSB     1       ; Program status flags
;         bit 0 - CVAC slope bit (0 = pos, 1 = neg)
;         bit 1 - big triangle bit (interpolation)
;         bit 2 - balance sign bit (0 = pos, 1 = neg)
;         bit 3 - yaw damping disable bit (0 = enable, 1 = disable)
;         bit 4 - yaw gyro sign bit (0 = pos, 1 = neg)
;         bit 5 - roll gyro cal bit (0 = no calibration, 1 = calibrate)
;         bit 6 - yaw gyro cal bit (0 = no calibration, 1 = calibrate)
;         bit 7 - 1st motion bit (0 = no 1st motion, 1 = 1st motion)

FLAGSET2:           DSB     1       ; Program status flags
;         bit 0 - pitch initial transition bit (0 = true, 1 = false)
;         bit 1 - yaw initial transition bit (0 = true, 1 = false)
;         bit 2 - More than 30 ms after power up bit (0 = false, 1 = true)

; General purpose scratch pad register area used by the HSI_D_A module
        HSI_ACC:            DSL     3

; shared with variable that holds the interpolated time of CVAC zero crossing
        INTRP_ZC_TIME       EQU     HSI_ACC             :word   ; (overlap)

; and with variable used to compute the time between pitch or yaw transitions
        DELTA_T1            EQU     HSI_ACC+2           :word   ; (overlap)

; Pitch steering filter intermediate variables
        PSDU1_IN:           DSL     1
        PSDU2_IN:           DSL     1
        PSDU3_OUT:          DSL     1
        PSDU4_OUT:          DSL     1

; Yaw steering filter intermediate variables
        YSDU1_IN:           DSL     1
        YSDU2_IN:           DSL     1
        YSDU3_OUT:          DSL     1
        YSDU4_OUT:          DSL     1

; Pitch balance filter intermediate variables
        PBDU1_IN:           DSL     1
        PBDU2_IN:           DSL     1
        PBDU3_IN:           DSL     1
        PBDU4_IN:           DSL     1

; Yaw balance filter intermediate variables
        YBDU1_IN:           DSL     1
        YBDU2_IN:           DSL     1
        YBDU3_IN:           DSL     1
        YBDU4_IN:           DSL     1

; Pitch/Yaw steering and balance input and output variables
        P_S_UNDRDMP_IN:     DSL     1
          P_FREQ_VALUE      EQU     P_S_UNDRDMP_IN      :long   ; (overlap)
          Y_S_UNDRDMP_IN    EQU     P_S_UNDRDMP_IN      :long   ; (overlap)
          Y_FREQ_VALUE      EQU     P_S_UNDRDMP_IN      :long   ; (overlap)
        P_S_UNDRDMP_OUT:    DSL     1
          Y_S_UNDRDMP_OUT   EQU     P_S_UNDRDMP_OUT     :long   ; (overlap)
        P_B_OVRDMP_IN:      DSL     1
          Y_B_OVRDMP_IN     EQU     P_B_OVRDMP_IN       :long   ; (overlap)
        P_B_OVRDMP_OUT:     DSL     1
          Y_B_OVRDMP_OUT    EQU     P_B_OVRDMP_OUT      :long   ; (overlap)
        P_B_UNDRDMP_IN:     DSL     1
          Y_B_UNDRDMP_IN    EQU     P_B_UNDRDMP_IN      :long   ; (overlap)
        P_B_UNDRDMP_OUT:    DSL     1
          Y_B_UNDRDMP_OUT   EQU     P_B_UNDRDMP_OUT     :long   ; (overlap)

; Variables used to hold the newest point (ordinate) along the CVAC signal
        NEW_P2_ORD:         DSW     1
          NEW_Y1_ORD        EQU     NEW_P2_ORD          :word   ; (overlap)
        NEW_P4_ORD:         DSW     1
          NEW_Y3_ORD        EQU     NEW_P4_ORD          :word   ; (overlap)

NEW_TIME:           DSW     1       ; Used to hold the time the newest
                                            ; ordinate was sampled
```

```
; Variables used to hold the times the previous ordinate was sampled          ;
        OLD_P_TIME:        DSW    1                                           ;
        OLD_Y_TIME:        DSW    1                                           ;
                                                                              ;
; Variables used to hold the previous point along the four CVAC signals       ;
        OLD_P2_ORD:        DSW    1                                           ;
        OLD_P4_ORD:        DSW    1                                           ;
        OLD_Y1_ORD:        DSW    1                                           ;
        OLD_Y3_ORD:        DSW    1                                           ;
                                                                              ;
; Variables used to hold the center value of the four CVAC signals            ;
        P2_CENTER:         DSW    1                                           ;
        P4_CENTER:         DSW    1                                           ;
        Y1_CENTER:         DSW    1                                           ;
        Y3_CENTER:         DSW    1                                           ;
                                                                              ;
; Variables used to compute the times the flipper commands are to be output   ;
        P2_LATCH_TIME:     DSW    1                                           ;
        P4_LATCH_TIME:     DSW    1                                           ;
        Y1_LATCH_TIME:     DSW    1                                           ;
        Y3_LATCH_TIME:     DSW    1                                           ;
                                                                              ;
        SOFT_VER_NUM:      DSB    1    ; Used in outputing software ver num   ;
                                                                              ;
        TIMER1_OVRFLW_CNT: DSB    1    ; Used to keep count of clock overflows;
                                                                              ;
; General purpose scratch pad register area used by the AD_CONVR module       ;
        AD_ACC:            DSL    3                                           ;
; shared with variables used to compute Roll and Yaw gyro calibration values  ;
        R_CAL_ACC          EQU    AD_ACC           :word  ; (overlap)         ;
        Y_CAL_ACC          EQU    AD_ACC+2         :word  ; (overlap)         ;
        R_CAL_CNTR         EQU    AD_ACC+10        :byte  ; (overlap)         ;
        Y_CAL_CNTR         EQU    AD_ACC+11        :byte  ; (overlap)         ;
                                                                              ;
; Roll and Yaw gyro filter intermediate variables and,                        ;
        RGDU1_IN:          DSL    1                                           ;
        YGDU1_IN           EQU    RGDU1_IN         :long  ; (overlap)         ;
        RGDU2_IN:          DSL    1                                           ;
        YGDU2_IN           EQU    RGDU2_IN         :long  ; (overlap)         ;
; also used to hold the values read from the A/D converter                    ;
        RAW_AD_VALUE       EQU    RGDU2_IN         :word  ; (overlap)         ;
        RAW_AD_VALUE_lo    EQU    RGDU2_IN         :byte  ; (overlap)         ;
        RAW_AD_VALUE_hi    EQU    RGDU2_IN+1       :byte  ; (overlap)         ;
        RGDU3_IN:          DSL    1                                           ;
        YGDU3_IN           EQU    RGDU3_IN         :long  ; (overlap)         ;
                                                                              ;
; Roll and Yaw gyro filter intermediate variables and,                        ;
        RGDU1_OUT:         DSL    1                                           ;
        RGDU2_OUT:         DSL    1                                           ;
        RGDU3_OUT:         DSL    1                                           ;
        YGDU1_OUT:         DSL    1                                           ;
        YGDU2_OUT:         DSL    1                                           ;
        YGDU3_OUT:         DSL    1                                           ;
                                                                              ;
        RGV:               DSW    1    ; Holds the roll into stering value    ;
        YGV:               DSW    1    ; Holds the yaw into stering value     ;
                                                                              ;
        AD_TIME_KEEPER:    DSW    1    ; Holds time of the last A/D conversion;
; and also used to hold the time to output the software version number       ;
        VER_NUM_TIME       EQU    AD_TIME_KEEPER   :word  ; (overlap)         ;
                                                                              ;
        YDD_DELAY_CNT:     DSB    1    ; Used for yaw damping disable delay   ;
                                                                              ;
        YDD_DELAY          SET    000BH     ;const ; 3.3ms per = 36ms         ;
                                                                              ;
        BALANCE_PORT       SET    6FFEH     :word  ; Balance DAC port         ;
                                                                              ;
        CHIP_CONFIG_REG    SET    2018H     :byte  ; 8797 only                ;
                                                                              ;
        SOFTWARE_VERSION   SET    3FFEH     :byte  ; Version number location  ;
                                                                              ;
        VERSION_NUMBER     SET    0002H     ;const ; Production version number;
                                                                              ;
        ;;;;;;;;;;;;;;;;;;;;;;;;;;;;;;;;;;;;;;;;;;;;;;;;;;;;;;;;;;;;;;;;;;;;;;;

CSEG    at     2080H
        DI                                          ; Disable interrupts.
```

```
                ; Initialize registers.

LD      SP, #100H

LDB     HSI_MODE, #10101011B        ; Set up HSI.0 for every trans.
                                            ; HSI.1 & 3 for every - trans.

LDB     IOC0, #01000100B            ; Enable HSI.1 and HSI.3
                                            ; Yaw and Pitch inputs.
        CLRB    IOC1                        ; 1) Int. on loaded hold. reg.
                                            ; 2) Disable TIMER overflow.
                                            ; 3) Select P2.5, P2.0
                                            ; 4) EXTINT as external interrupt LDB     BALANCE_IMAGE, #128D        ; Zero error balance value
        CLRB    IOPORT2                     ; Select pitch balance (P2.5)
        ST      BALANCE_IMAGE_W0, BALANCE_PORT ; Init. pitch balance error
        ORB     IOPORT2, #00100000B         ; Select yaw balance (P2.5)
        ST      BALANCE_IMAGE_W0, BALANCE_PORT ; Init. yaw balance error
        LDB     IOPORT1, #11111111B         ; Init. P1.3 for YDD input;

CLRB    IOS1_IMAGE                  ; Clear image of IOS1 reg.

LDB     HSO_COMMAND, #00100110B     ; Set HSO.0 and HSO.1, turn
        ADD     HSO_TIME, TIMER1, #3        ; off P4 and Y1 flippers.
        LDB     HSO_COMMAND, #00100111B     ; Set HSO.2 and HSO.3, turn
        ADD     HSO_TIME, TIMER1, #3        ; off P2 and Y3 flippers.

LDB     FLAGSET1, #01100000B        ; Set gyro calibrate bits 5 & 6
        CLRB    FLAGSET2                    ; Clear initial transition bits,
                                            ; 30 msec bit.
        LDB     HSO_COMMAND, #00011001B     ; Set software timer 1 to go
        ADD     HSO_TIME, TIMER1, #15000D   ; off in 30ms
        BR      init_variables              ; Skip output of soft ver num write_soft_ver_no:
        LDB     SOFT_VER_NUM, SOFTWARE_VERSION ; Get software version number ADD     VER_NUM_TIME, TIMER1, #8D   ; Compute time to write out
                                            ; version number
        BBS     SOFT_VER_NUM, 0, bit1       ; Check bit 0
        LDB     HSO_COMMAND, #00000001B     ; Write bit 0 to flipper Y1
        LD      HSO_TIME, VER_NUM_TIME      ; at version number time
bit1:
        BBS     SOFT_VER_NUM, 1, bit2       ; Check bit 1
        LDB     HSO_COMMAND, #00000010B     ; Write bit 1 to flipper P2
        LD      HSO_TIME, VER_NUM_TIME      ; at version number time
bit2:
        BBS     SOFT_VER_NUM, 2, bit3       ; Check bit 2
        LDB     HSO_COMMAND, #00000011B     ; Write bit 2 to flipper Y3
        LD      HSO_TIME, VER_NUM_TIME      ; at version number time
bit3:
        BBS     SOFT_VER_NUM, 3, init_cont  ; Check bit 3
        LDB     HSO_COMMAND, #00000000B     ; Write bit 3 to flipper P4
        LD      HSO_TIME, VER_NUM_TIME      ; at version number time init_cont:
        LDB     HSO_COMMAND, #00011000B     ; Set software timer 0 to go
        SUB     HSO_TIME, TIMER1, #3D       ; off in 130ms init_variables:
        CLRB    TIMER1_OVRFLW_CNT           ; Initialize TIMER1 overflows LDB     YDD_DELAY_CNT, #YDD_DELAY   ; Initialize the Ydd delay count.

LD      P2_CENTER, #(32767D + 7951D) ; 560Hz & 0 deg. equivalents
        LD      P4_CENTER, #(32767D - 7951D) ;
        LD      Y1_CENTER, #(32767D - 2865D) ; 870Hz & 0 deg. equivalents
        LD      Y3_CENTER, #(32767D + 2865D) ;

LD      OLD_P2_ORD, #42501D         ; Initialize old CVAC ordinates
        LD      OLD_P4_ORD, #42501D         ; to maintain an up and right
        LD      OLD_Y1_ORD, #36500D         ; steering command after 1st
        LD      OLD_Y3_ORD, #36500D         ; motion until the launcher
                                            ; issues a different command.

LD      PSDU1_IN,   #0D             ; Initialize steering filter
        LD      PSDU1_IN+2, #26776D         ;
```

```
LD      PSDU2_IN,      #0D              ; delay units to zero error
LD      PSDU2_IN+2,    #30202D          ;
LD      PSDU3_OUT,     #0D              ; average values.
LD      PSDU3_OUT+2,   #30996D          ;
LD      PSDU4_OUT,     #0D              ;
LD      PSDU4_OUT+2,   #3840D           ;
LD      YSDU1_IN,      #0D              ;
LD      YSDU1_IN+2,    #23884D          ;
LD      YSDU2_IN,      #0D              ;
LD      YSDU2_IN+2,    #28016D          ;
LD      YSDU3_OUT,     #0D              ;
LD      YSDU3_OUT+2,   #22213D          ;
LD      YSDU4_OUT,     #0D              ;
LD      YSDU4_OUT+2,   #7200D           ;

LD      PBDU1_IN,      #0D              ; Initialize balance filter
LD      PBDU1_IN+2,    #12458D          ;
LD      PBDU2_IN,      #0D              ; delay units to zero error
LD      PBDU2_IN+2.    #8666D           ;
LD      PBDU3_IN,      #0D              ; average values. (Pitch)
LD      PBDU3_IN+2,    #14775D          ;
LD      PBDU4_IN,      #0D              ;
LD      PBDU4_IN+2,    #7619D           ;

LD      YBDU1_IN,      #0D              ; Initialize balance filter
LD      YBDU1_IN+2,    #13377D          ;
LD      YBDU2_IN,      #0D              ; delay units to zero error
LD      YBDU2_IN+2,    #10606D          ;
LD      YBDU3_IN,      #0D              ; average values. (Yaw)
LD      YBDU3_IN+2,    #15096D          ;
LD      YBDU4_IN,      #0D              ;
LD      YBDU4_IN+2,    #9988D           ;

LD      RGDU1_OUT,     #0D              ; Initialize gyro filter delay
LD      RGDU1_OUT+2,   #2806D           ;
LD      RGDU2_OUT,     #0D              ; units to zero error average
LD      RGDU2_OUT+2,   #16081D          ;
LD      RGDU3_OUT,     #0D              ; values.
LD      RGDU3_OUT+2,   #10280D          ;
LD      YGDU1_OUT,     #0D              ;
LD      YGDU1_OUT+2,   #2336D           ;
LD      YGDU2_OUT,     #0D              ;
LD      YGDU2_OUT+2,   #15943D          ;
LD      YGDU3_OUT,     #0D              ;
LD      YGDU3_OUT+2,   #22827D          ;

CLRB    R_CAL_CNTR                      ; For GYRO CALIBRATION
CLRB    Y_CAL_CNTR                      ;

LD      RGV, #7951D                     ; 0 deg. ROLL equivs.
LD      YGV, #0                         ;

LDB     AD_COMMAND, #00000010B          ; Command to start a ROLL A/D
        LDB     HSO_COMMAND, #00011111B         ; conversion
        LD      AD_TIME_KEEPER, TIMER1          ; Start a conversion 131ms from
        LD      HSO_TIME, AD_TIME_KEEPER        ; now ; Now, enable interrupts.
        CLRB    INT_PENDING                     ; Clear any pending interrupts flush_the_HSI_FIFO:
        LD      ZERO, HSI_TIME
        BBS     IOS1, 7, flush_the_HSI_FIFO LDB     INT_MASK, #00100110B            ; Mask off all but ST,
                                                ; HSI_D_A, A/D CONV.

EI
                ; All interrupts pull from the following idle loop.
idle_loop:
        BBC     FLAGSET1, 7, idle_loop   ; Check for 1st motion
        ANDB    INT_MASK, #11011111B     ; If found, mask ST
        BR      idle_loop
;;;;;;;;;;;;;;;;;;;;;;;;;;;;;;;;;;;;;;;;;;;;;;;;;;;;;;;;;;;;;;;;
;                                                               ;
;   All wild interrupts will be thrown to this routine.         ;
;                                                               ;
;;;;;;;;;;;;;;;;;;;;;;;;;;;;;;;;;;;;;;;;;;;;;;;;;;;;;;;;;;;;;;;;
```

```
error_code:
        PUSHF

NOP                     ; Ignore wild interrupts.

POPF
        RET $ EJECT
$ TITLE("HSI DATA AVAILABLE INTERRUPT SERVICE ROUTINE")
;HSI_D_A        MODULE
; This I.S.R. receives and handles transitions on lines HSI.3 and HSI.1 (pitch
; and yaw FM signals).
;
; The Pitch and Yaw FM signals contain both the steering and the balance infor-
; mation. The balance function consists of reading input frequencies, filter-
; ing the frequencies and converting the filtered outputs into a balance code
; which the launcher can use in integrated form to slew the constant FM freq-
; uencies back to their respective center values.
;
; The steering function consists of reading and filtering the FM signals, then
; combining these with Roll and Yaw gyro values to form values which control
; the missile flippers (Y1,P2,Y3,P4)
;
;;;;;;;;;;;;;;;;;;;;;;;;;;;;;;;;;;;;;;;;;;;;;;;;;;;;;;;;;;;;;;;;;;;;;;;;;;;;

hsi_data_available_ISR:
        PUSHF
;;;;;;;;;;;;;;;;;;;;;;;;;;;;;;;;;;;;;;;;;;;;;;;;;;;;;;;;;;;;;;;;;;;;;;;;;;;;
;                                                                          ;
;               S T E E R I N G   A N D   B A L A N C E                    ;
;                                                                          ;
;;;;;;;;;;;;;;;;;;;;;;;;;;;;;;;;;;;;;;;;;;;;;;;;;;;;;;;;;;;;;;;;;;;;;;;;;;;;
steering_or_balance:
        ANDB    IOS1_IMAGE, #00111111B          ; Clear HSI data available bits
        ORB     IOS1_IMAGE, IOS1                ; Update status of HSI FIFO
        BBS     IOS1_IMAGE, 7, service_the_int  ; Check if HSI data available

POPF
        RET service_the_int:
        LDB     HSI_STATUS_IMAGE, HSI_STATUS
        LD      NEW_TIME, HSI_TIME BBS     HSI_STATUS_IMAGE, 6, p_chnl_strg_or_bal ; Jump if tran. on HSI.3
ysx_check:
        BBS     HSI_STATUS_IMAGE, 2, y_chnl_strg_or_bal ; Jump if tran. on HSI.1
exit_routine:
        DI
        ANDB    IOS1_IMAGE, #00111111B          ; Clear HSI data available bits
        ORB     IOS1_IMAGE, IOS1                ; Update status of HSI FIFO
        BBS     IOS1_IMAGE, 7, steering_or_balance ; Check if HSI data available

POPF
        RET

;;;;;;;;;;;;;;;;;;;;;;;;;;;;;;;;;;;            ;;;;;;;;;;;;;;;;;;;;;;;;;;;;;;;;
;;;;;;;;;;;;;;;;;;;;;;;;;;;;;;;;;;;  Pitch Channel  ;;;;;;;;;;;;;;;;;;;;;;;;;;;;
;;;;;;;;;;;;;;;;;;;;;;;;;;;;;;;;;;;            ;;;;;;;;;;;;;;;;;;;;;;;;;;;;;;;;

p_chnl_strg_or_bal:
        BBS     FLAGSET1, 7, skip_D1            ; If 1st motion then skip next in
        ORB     INT_MASK, #00100000B            ; Unmask ST
skip_D1:
        EI
        BBS     FLAGSET2, 0, not_1st_pbx        ; Check for first pitch trans.
        LD      OLD_P_TIME, NEW_TIME            ; Store time of 1st pitch trans
        ORB     FLAGSET2, #00000001B            ; Set 'bit'
        BR      ysx_check
                ; Execute the next instructions for all but
                ; the first pitch transition.
```

```
not_1st_pbx:
        LD      HSI_ACC+4, #18432D          ; Numerator = 32,000,000
        LD      HSI_ACC+6, #488D            ;           = 500,000*2^6
        SUB     DELTA_T1, NEW_TIME, OLD_P_TIME  ; Find time difference (timer1
                                            ; increments) between tran's.

BBC     FLAGSET1, 7, limit_p_input  ; Skip next inst. till 1st mot
        SHL     DELTA_T1, #1                ; Convert half perd to full pe ;;;;;;;;;;;;;;;;;    Hard limit the inputs    ;;;;;;;;;;;;;;;;;;;;;;;;;
                                                                        ;
limit_p_input:                                                          ;
        CMP     DELTA_T1, #746D             ; Glitch protection         ;
        BC      skip1                       ;  ~670Hz                   ;
        CMP     DELTA_T1, #1111D            ;  ~450Hz                   ;
        BH      skip1                       ;                           ;
        LD      OLD_P_TIME, NEW_TIME        ; Update old time           ;
        BR      ysx_check                   ; Ignore bad data           ;
skip1:                                                                  ;
        CMP     DELTA_T1, #781D             ; Check the upper band limit;
        BC      skip2                       ;  ~640Hz                   ;
        LD      DELTA_T1, #781D                                         ;
skip2:                                                                  ;
        CMP     DELTA_T1, #1042D            ; Check the lower band limit;
        BNH     skip3                       ;  ~480Hz                   ;
        LD      DELTA_T1, #1042D                                        ;
                                                                        ;
        ;;;;;;;;;;;;;;;;;;;;;;;;;;;;;;;;;;;;;;;;;;;;;;;;;;;;;;;;;;;;;;;;;
skip3:
        DIVU    HSI_ACC+4, DELTA_T1         ; Finds pitch frq. @ 2^6 lsb/Hz ;;;;;;;;    Extend the Pitch frequency to 32 bits    ;;;;;;;;;;;;;;;;;;;
                                                                        ;
        LD      HSI_ACC+10, HSI_ACC+4       ; Transfer upper word       ;
                                                                        ;
        CMP     HSI_ACC+6, ZERO             ; Execute for zero remainder;
        BNE     p_32bit_extension           ;                           ;
        CLR     HSI_ACC+8                   ;                           ;
        BR      p_check_for_1st_motion      ;                           ;
p_32bit_extension:                                                      ;
        CLR     HSI_ACC                     ; Extend scaled filter (freq.);
        NORML   HSI_ACC, HSI_ACC+8          ; input to 32 bits by       ;
        SHL     HSI_ACC+6, HSI_ACC+8        ; restoring the remainder.  ;
        CLR     HSI_ACC+4                   ;                           ;
        DIVU    HSI_ACC+4, HSI_ACC+2        ;                           ;
        LD      HSI_ACC+8, HSI_ACC+4        ;                           ;
                                                                        ;
        ;;;;;;;;;;;;;;;;;;;;;;;;;;;;;;;;;;;;;;;;;;;;;;;;;;;;;;;;;;;;;;;;;

p_check_for_1st_motion:
        LD      P_FREQ_VALUE, HSI_ACC+8     ; Transfer for steering
        LD      P_FREQ_VALUE+2, HSI_ACC+10  ;

BBS     FLAGSET1, 7, p_chnl_strg    ; Branch after 1st motion

;;;;;;;;;;;;;;;;;;;;;;;;;;;;;;;    ;;;;;;;;;;;;;;;;;;;;;;;;;;;;;;;
;;;;;;;;;;;;;;;;;;;;;;;;;;;;;;;    Pitch Channel Balance  ;;;;;;;;;;;;;;;;;;;;;;;;;;;;;;
;;;;;;;;;;;;;;;;;;;;;;;;;;;;;;;    ;;;;;;;;;;;;;;;;;;;;;;;;;;;;;;;

;;;;;;;;    Hard limit the input frequency for BALANCE    ;;;;;;;;;;;;;;;
                                                                        ;
        CMP     HSI_ACC+10, #34880D         ; Check the lower band limit;
        BC      skip4                       ;  ~545Hz                   ;
        LD      HSI_ACC+10, #34880D                                     ;
        LD      HSI_ACC+8, #00000D                                      ;
skip4:                                                                  ;
        CMP     HSI_ACC+10, #36800D         ; Check the upper band limit;
        BNH     subtract_pb_offset          ;  ~575Hz                   ;
        LD      HSI_ACC+10, #36800D                                     ;
        LD      HSI_ACC+8, #00000D                                      ;

;;;;;;;;    Subtract off constant offset and scale up    ;;;;;;;;;;;;;;
```

```
subtract_pb_offset:
        SUB     HSI_ACC+8, #00000D
        SUBC    HSI_ACC+10, #33920D         ; 33,920 = 530 Hz @ 2^-6

SHLL    HSI_ACC+8, #3               ; Mult. by 8 to get
                                            ;   offset deltaF at 2^-9

;   ******************  Execute the BALANCE filter:  ***********************
;   **************  4 POLE 1 ZERO low pass (40 Hz. cutoff)  ****************

;;;;;;;;  Scale and save the filter input for later  ;;;;;;;;;;;;;;;

MULU    HSI_ACC, HSI_ACC+8, #12382D    ; The offset deltaF becomes
        MULU    HSI_ACC+4, HSI_ACC+10, #12382D ; the filter input
        ADD     HSI_ACC+4, HSI_ACC+2
        ADDC    HSI_ACC+6, ZERO                ; (offset deltaF)*0.188929

LD      P_B_OVRDMP_IN, HSI_ACC+4       ; Save the filter input
        LD      P_B_OVRDMP_IN+2, HSI_ACC+6

;;;;;;;  Find 1st 2 pole filter output Vc = 40 Hz, Zeta = 0.9  ;;;;;;;

ADD     HSI_ACC+4, PBDU1_IN            ; This forms the overdamped output
        ADDC    HSI_ACC+6, PBDU1_IN+2          ; which goes into the underdamped fil.

LD      P_B_OVRDMP_OUT, HSI_ACC+4      ; Save the overdamped output
        LD      P_B_OVRDMP_OUT+2, HSI_ACC+6    ; for post-filter calcs.

;;;;;;;  Find 2nd 2 pole filter output Vc = 40 Hz, Zeta = 0.7  ;;;;;;;

MULU    HSI_ACC, HSI_ACC+4, #19913D    ; The offset deltaF becomes
        MULU    HSI_ACC+4, HSI_ACC+6, #19913D  ; the filter input
        ADD     HSI_ACC+4, HSI_ACC+2
        ADDC    HSI_ACC+6, ZERO                ; (19,913/65,536)*0.125 =
        SHRL    HSI_ACC+4, #3                  ;               0.03798027

LD      P_B_UNDRDMP_IN, HSI_ACC+4      ; Save the underdamped input
        LD      P_B_UNDRDMP_IN+2, HSI_ACC+6    ; for post-filter calcs.

ADD     HSI_ACC+4, PBDU3_IN            ; This forms the underdamped output
        ADDC    HSI_ACC+6, PBDU3_IN+2          ; ( = 4 pole filter output )

LD      P_B_UNDRDMP_OUT, HSI_ACC+4     ; Save the underdamped output
        LD      P_B_UNDRDMP_OUT+2, HSI_ACC+6   ; for post-filter calcs.
        SHLL    HSI_ACC+4, #1                  ; Scale up to 2^-10

;;;;;;;;  Find the absolute value of deltaF  ;;;;;;;;;;;;;;;;;;;;;;

ANDB    FLAGSET1, #11111011B           ; Clear Balance sign bit (+)
        SUB     HSI_ACC+4, #37468D             ; Subtract 29.753488 Hz. (@ 2^-10)
        SUBC    HSI_ACC+6, #30467D             ; offset to get deltaF (@ 2^-10)

BC      check_LO_CVAC
        NOT     HSI_ACC+4                      ; Take the absolute value
        NOT     HSI_ACC+6                      ;  of deltaF and set bit
        ADD     HSI_ACC+4, #1
        ADDC    HSI_ACC+6, ZERO
        ORB     FLAGSET1, #00000100B check_LO_CVAC:
        BBC     FLAGSET2, 2, hard_limit_pb_deltaF ; Fail if time < 30 ms
        CMP     HSI_ACC+6, #10240D             ; Check if |deltaF| >= 10Hz @2^-10
        BNC     hard_limit_pb_deltaF           ; Fail if |deltaF| < 10Hz found_CVAC:
        CALL    CVAC_First_motion              ; CVAC signals first motion ;;;;;;;;;;;;;;;;;  Hard-limit the error frequency  ;;;;;;;;;;;;;;;;;

hard_limit_pb_deltaF:
        CMP     HSI_ACC+6, #6336D              ; Check magnitude of deltaF
```

```
           BNC     scale_pb_deltaF
           LD      HSI_ACC+6, #6336D              ; |deltaF| < 6.2 Hz (@ 2^-10) ;
           LD      HSI_ACC+4, ZERO                                              ;

;;;;;;;;   Convert deltaF to BALANCE code and output   ;;;;;;;;;;;;;;;;
scale_pb_deltaF:                                                                ;
           MULU    HSI_ACC, HSI_ACC+4, #39140D    ; (39,140/65,536) * 2^5       ;
           MULU    HSI_ACC+4, HSI_ACC+6, #39140D  ;  = 0.597222222 * 2^5        ;
           ADD     HSI_ACC+4, HSI_ACC+2           ;  = 19.11111111              ;
           ADDC    HSI_ACC+6, ZERO                ; (deltaF) *.597222222 (@ 2^5);
                                                                                ;
           SHLL    HSI_ACC+4, #3                  ; Multiply by 8 (@ 2^8)       ;

LD      HSI_ACC, #32768D               ; Load Balance center value   ;
                                                  ; 128 (@ 2^8)                 ;
           BBS     FLAGSET1, 2, neg_pb_deltaF
           SUB     HSI_ACC, HSI_ACC+6             ; Execute for +deltaF         ;
           BC      form_pb_output_byte
           LD      HSI_ACC, ZERO
           BR      form_pb_output_byte                                          ;
                                                                                ;
neg_pb_deltaF:                                                                  ;
           ADD     HSI_ACC, HSI_ACC+6             ; Execute for -deltaF form_pb_output_byte:
           SHR     HSI_ACC, #8                    ; Scale down to 2^0           ;
           BNC     pb_output                                                    ;
           INCB    HSI_ACC                        ; Round up if necessary       ;
pb_output:
           BBS     FLAGSET1, 7, p_chnl_strg       ; Skip after 1st motion       ;
           DI                                                                   ;
           ANDB    IOPORT2, #11011111B            ; Select pitch channel (P2.5) ;
           LDB     BALANCE_IMAGE_W0+1, HSI_ACC    ; Transfer high order byte.   ;
           ST      BALANCE_IMAGE_W0, BALANCE_PORT ; Output the balance value    ;
           EI                                                                   ;
           BBC     FLAGSET1, 7, pitch_post_balance_calculations ; Skip steering ;
                                                                 ; till 1st motion;

;;;;;;;;;;;;;;;;;;;;;;;;;;;;               ;;;;;;;;;;;;;;;;;;;;;;;;;;;;;;;;;;;
;;;;;;;;;;;;;;;;;;;;;;;;;;;;;    Pitch channel steering   ;;;;;;;;;;;;;;;;;;;;;;;;;;;;;
;;;;;;;;;;;;;;;;;;;;;;;;;;;;               ;;;;;;;;;;;;;;;;;;;;;;;;;;;;;;;;;;;
p_chnl_strg:

;;;;;;;;   Subtract off constant offset and scale up   ;;;;;;;;;;;;;;;

LD      HSI_ACC+8, P_FREQ_VALUE        ; Transfer to working         ;
           LD      HSI_ACC+10, P_FREQ_VALUE+2     ;  registers                  ;

SUB     HSI_ACC+8, #00000D                                           ;
           SUBC    HSI_ACC+10, #28160D            ; 28,160 = 440 Hz @ 2^6       ;
                                                                                ;

;   ******************* Execute the STEERING filter: ***********************
;   *************************    4 POLE 1 ZERO       ***********************
;   *** (2-1st ord. low pass cascaded with 2nd ord. underdamped low pass) ***

;;;;;;;;;;;;;  Scale the filter input for first stage  ;;;;;;;;;;;;;;

MULU    HSI_ACC+4, HSI_ACC+8, #15662D  ; The offset deltaF becomes   ;
           MULU    HSI_ACC+8, HSI_ACC+10, #15662D ;  the filter input           ;
           ADD     HSI_ACC+8, HSI_ACC+6           ; (offset deltaF)*0.238978761 ;
           ADDC    HSI_ACC+10, ZERO               ;  scaled 2^6                 ;

;;;;;;;;;;;;;;;;;;;  1st order low pass Wp = 108 Hz  ;;;;;;;;;;;;;;;;

;;;;;;;;   First find PSDU4_IN   ;;;;;;;;;;;;;;;;;;;;;;;;;;;;;;;
                                                                                ;
           MULU    HSI_ACC, PSDU4_OUT, #34213D    ; (34,213/65,536)             ;
           MULU    HSI_ACC+4, PSDU4_OUT+2, #34213D;  = 0.522042477 *            ;
           ADD     HSI_ACC+4, HSI_ACC+2           ;        PSDU4_OUT            ;
           ADDC    HSI_ACC+6, ZERO                                              ;

ADD     HSI_ACC+4, HSI_ACC+8           ; Add in the input to get     ;
           ADDC    HSI_ACC+6, HSI_ACC+10          ;  new PSDU4_IN               ;
```

```
;;;;;;;;   Now find the output and update the state variable  ;;;;
     ADD    HSI_ACC+8, HSI_ACC+4, PSDU4_OUT    ; Add to PSDU4_IN
     LD     HSI_ACC+10, HSI_ACC+6
     ADDC   HSI_ACC+10, PSDU4_OUT+2            ; Output found @2^6

LD     PSDU4_OUT, HSI_ACC+4               ; Update PSDU4_OUT
     LD     PSDU4_OUT+2, HSI_ACC+6             ;   for next time

;;;;;;;;;;;;;;;;;;;;;;;;;;;;;;;;;;;;;;;;;;;;;;;;;;;;;;;;;;;;;;;;;

;;;;;;;;;;;;;   Scale the filter input for second stage  ;;;;;;;;;;;;;;

MULU   HSI_ACC+4, HSI_ACC+8, #38903D    ; The offset deltaF becomes
     MULU   HSI_ACC+8, HSI_ACC+10, #38903D   ;  the filter input
     ADD    HSI_ACC+8, HSI_ACC+6             ; (offset deltaF)*0.593614207
     ADDC   HSI_ACC+10, ZERO                 ; scaled 2^6

;;;;;;;;;;;;   1 pole 1 zero filter Vp = 28 Hz, Vz = 50 Hz ;;;;;;;;;;;;

;;;;;;;;    First find PSDU3_IN  ;;;;;;;;;;;;;;;;;;;;;;;;;;;;;;;

MULU   HSI_ACC, PSDU3_OUT, #55897D      ; (55,897/65,536)
     MULU   HSI_ACC+4, PSDU3_OUT+2, #55897D  ;    = 0.8529171308 *
     ADD    HSI_ACC+4, HSI_ACC+2             ;         PSDU3_OUT
     ADDC   HSI_ACC+6, ZERO

ADD    HSI_ACC+4, HSI_ACC+8             ; Add in the input to get
     ADDC   HSI_ACC+6, HSI_ACC+10            ; new PSDU3_IN ;;;;;;;;   Now find the output and update the state variable  ;;;;

MULU   HSI_ACC, PSDU3_OUT, #49298D      ; (49,298/65,536)
     MULU   HSI_ACC+8, PSDU3_OUT+2, #49298D  ;    = 0.7522248163 *
     ADD    HSI_ACC+8, HSI_ACC+2             ;         PSDU3_OUT
     ADDC   HSI_ACC+10, ZERO

SUB    HSI_ACC, HSI_ACC+4, HSI_ACC+8    ; Subtract from PSDU3_IN;
     LD     HSI_ACC+2, HSI_ACC+6
     SUBC   HSI_ACC+2, HSI_ACC+10            ; Output found @2^6

LD     PSDU3_OUT, HSI_ACC+4             ; Update PSDU3_OUT
     LD     PSDU3_OUT+2, HSI_ACC+6           ;   for next time

;;;;;;;;;;;;;;;;;;;;;;;;;;;;;;;;;;;;;;;;;;;;;;;;;;;;;;;;;;;;;;;;;

;;;;;;;;   Now execute the 2nd order underdamped filter  ;;;;;;;;;;;;;

;;;;;;;;   First scale and save the input   ;;;;;;;;;;;;;;;;;;;;;

MULU   HSI_ACC+4, HSI_ACC, #4419D       ; (4,419/65,536) * .25
     MULU   HSI_ACC+8, HSI_ACC+2, #4419D     ;    = 0.016857905
     ADD    HSI_ACC+8, HSI_ACC+6             ; scaled @ 2^8
     ADDC   HSI_ACC+10, ZERO LD     P_S_UNDRDMP_IN, HSI_ACC+8        ; Save the underdamped
     LD     P_S_UNDRDMP_IN+2, HSI_ACC+10     ; fil. input for later ;;;;;;;;   Find, clamp, scale and save the output  ;;;;;;;;;;;;;;

ADD    HSI_ACC+8, PSDU2_IN              ; Offset deltaF (@ 2^8)
     ADDC   HSI_ACC+10, PSDU2_IN+2           ;    = FILTER OUTPUT !!!

CMP    HSI_ACC+10, #10240D              ; Check the lower band
     BC     chk_pitch_upper_limit            ;   limit ~480Hz
     LD     HSI_ACC+8, ZERO
     LD     HSI_ACC+10, #10240D              ; (480 - 440) * 2^8
chk_pitch_upper_limit:
     CMP    HSI_ACC+10, #51200D              ; Check the upper band
     BNH    save_pitch_filter_output         ;   limit ~640Hz
     LD     HSI_ACC+8, ZERO
     LD     HSI_ACC+10, #51200D              ; (640 - 440) * 2^8 save_pitch_filter_output:
     LD     P_S_UNDRDMP_OUT, HSI_ACC+8       ; Save the underdamped
     LD     P_S_UNDRDMP_OUT+2, HSI_ACC+10    ; fil. output for later SHRL   HSI_ACC+8, #2                    ; Scale down to 2^6
```

```
        BBC     HSI_ACC+9, 7, combine_p_strg_with_gyro
        INC     HSI_ACC+10                      ; Round if necessary ;;;;;;;;;;;;;;;;;;;;;;;;;;;;;;;;;;;;;;;;;;;;;;;;;;;;;;;;;;;;;;;;;;;;;;;
combine_p_strg_with_gyro:
        ADD     HSI_ACC+10, #25103D             ; First add in centering constant
                                                ; (32,767 - 25,103 + (119.75Hz @ 2^6))

ADD     NEW_P2_ORD, HSI_ACC+10, RGV     ; This finds the new ordinates
        SUB     NEW_P4_ORD, HSI_ACC+10, RGV     ;   for P2 and P4

;;;;;;;;         Check to see whether or not P2 has crossed       ;;;;;;;;
;;;;;;;;         the "zero" axis by applying the opposite sign test ;;;;;;;;
;;;;;;;;            to the new P2 ordinate and the old P2 ordinate  ;;;;;;;;

P2_opposite_sign_test:
        ANDB    FLAGSET1, #11111100B            ; Clear slope (+slope) and
                                                ; big triangle (big NEW) bits
        SUB     HSI_ACC+2, NEW_P2_ORD, OLD_P2_ORD ; Determine slope
        BE      P4_opposite_sign_test           ; No ZC if NEWP2ORD=OLDP2ORD
        BNC     negative_P2_slope SUB     HSI_ACC+6, NEW_P2_ORD, P2_CENTER
        BNH     P4_opposite_sign_test           ; fail if NEWP2ORD <= P2CTR
        SUB     HSI_ACC+4, P2_CENTER, OLD_P2_ORD
        BNE     around1
        LD      INTRP_ZC_TIME, OLD_P_TIME
        BR      P2_Output
around1:
        BNC     P4_opposite_sign_test           ; fail if OLDP2ORD > P2CTR
        BR      confirmed_P2_zero_crossing
negative_P2_slope:
        ORB     FLAGSET1, #00000001B            ; Set slope bit (-slope)
        SUB     HSI_ACC+6, P2_CENTER, NEW_P2_ORD
        BNH     P4_opposite_sign_test           ; fail if NEWP2ORD >= P2CTR
        SUB     HSI_ACC+4, OLD_P2_ORD, P2_CENTER
        BNE     around2
        LD      INTRP_ZC_TIME, OLD_P_TIME
        BR      P2_Output
around2:
        BNC     P4_opposite_sign_test           ; fail if OLDP2ORD < P2CTR
        NEG     HSI_ACC+2

;;;;;;;;;;;;;;;;;;;;;;;;;;;;;;;;;;;;;;;;;;;;;;;;;;;;;;;;;;;;;;;;;;;;;;;

;;;;;;;;         Now find the zero crossing on flipper P2         ;;;;;;;;;
;;;;;;;;         by linear interpolation if the opposite sign test ;;;;;;;;;
;;;;;;;;              confirms that a zero crossing exits         ;;;;;;;;;

confirmed_P2_zero_crossing:
        CMP     HSI_ACC+6, HSI_ACC+4            ;\
        BC      skip5                           ; > Determine numerator
        LD      HSI_ACC+6, HSI_ACC+4            ;/
        ORB     FLAGSET1, #00000010B            ; Set big tri. bit (big OLD)
skip5:
        CLR     HSI_ACC
        NORML   HSI_ACC, HSI_ACC+4              ; Normalize the denominator SHL     HSI_ACC+6, HSI_ACC+4            ; Sub-normalize numerator
        CLR     HSI_ACC+4

DIVU    HSI_ACC+4, HSI_ACC+2            ; Puts 'quotient' in HSI_ACC+4;
        SUB     HSI_ACC+6, NEW_TIME, OLD_P_TIME ; Calculate co-factor
        MULU    HSI_ACC+4, HSI_ACC+6
        BBC     HSI_ACC+5, 7, skip6
        INC     HSI_ACC+6                       ; ACC6 <== rounded('offset')
skip6:
        SUB     INTRP_ZC_TIME, NEW_TIME, HSI_ACC+6 ; ZC <== Tnew - OFFSET
        BBC     FLAGSET1, 1, P2_Output          ; Branch if big NEW tri.
        ADD     INTRP_ZC_TIME, OLD_P_TIME, HSI_ACC+6 ; ZC <== Told - OFFSET

;;;;;;;;;;;;;;;;;;;;;;;;;;;;;;;;;;;;;;;;;;;;;;;;;;;;;;;;;;;;;;;;;;;;;;;

;;;;;;;;         Now output the P2 flipper command         ;;;;;;;;;;;;;;;;;;;;;;;
```

```
P2_Output:
        DI                                              ;
        BBC     IOSO, 7, P2_command     ; Check CAM-file holding     ;
        EI                              ;   register status          ;
        BR      P2_Output               ; Loop until free            ;
P2_command:                                                          ;
        LDB     HSO_COMMAND, #00000010B ; Clear P2-1 (+slope)        ;
        BBC     FLAGSET1, 0, skip7      ; Slope bit                  ;
        LDB     HSO_COMMAND, #00100010B ; Set P2 (-slope)            ;
skip7:                                                               ;
        ADD     P2_LATCH_TIME, INTRP_ZC_TIME, #1000D ; Delay (2.0msec) ;
                                                                     ;
        SUB     HSI_ACC, P2_LATCH_TIME, #8D   ; Check if there is still ;
        SUB     HSI_ACC, TIMER1               ;  time to set P2 at the ;
        BBC     HSI_ACC+1, 7, skip8           ;  desired time.          ;
        ADD     HSO_TIME, TIMER1, #3          ; If late, do it now      ;
        BR      P4_opposite_sign_test                                  ;
skip8:                                                                 ;
        LD      HSO_TIME, P2_LATCH_TIME                                ;
                                                                       ;
        ;;;;;;;;;;;;;;;;;;;;;;;;;;;;;;;;;;;;;;;;;;;;;;;;;;;;;;;;;;;;;

;;;;;;;;;       Check to see whether or not P4 has crossed    ;;;;;;;
        ;;;;;;;;;     the "zero" axis by applying the opposite sign test ;;;;;;;
        ;;;;;;;;;       to the new P4 ordinate and the old P4 ordinate  ;;;;;;;

P4_opposite_sign_test:                                                 ;
        EI                                                             ;
        ANDB    FLAGSET1, #11111100B    ; Clear slope (+slope) and     ;
                                        ; big triangle (big NEW) bits  ;
        SUB     HSI_ACC+2, NEW_P4_ORD, OLD_P4_ORD  ; Determine slope   ;
        BE      p_strg_filter_calculations         ;    No ZC if       ;
        BNC     negative_P4_slope                  ;  NEWP4ORD=OLDP4ORD ;

SUB     HSI_ACC+6, NEW_P4_ORD, P4_CENTER                       ;
        BNH     p_strg_filter_calculations  ; fail if NEWP4ORD <= P4CTR;
        SUB     HSI_ACC+4, P4_CENTER, OLD_P4_ORD                       ;
        BNE     around3                                                ;
        LD      INTRP_ZC_TIME, OLD_P_TIME                              ;
        BR      P4_Output                                              ;
around3:                                                               ;
        BNC     p_strg_filter_calculations  ; fail if OLDP4ORD > P4CTR ;
        BR      confirmed_P4_zero_crossing                             ;
negative_P4_slope:                                                     ;
        ORB     FLAGSET1, #00000001B            ; Set slope bit (-slope) ;
        SUB     HSI_ACC+6, P4_CENTER, NEW_P4_ORD                       ;
        BNH     p_strg_filter_calculations  ; fail if NEWP4ORD >= P4CTR ;
        SUB     HSI_ACC+4, OLD_P4_ORD, P4_CENTER                       ;
        BNE     around4                                                ;
        LD      INTRP_ZC_TIME, OLD_P_TIME                              ;
        BR      P4_Output                                              ;
around4:                                                               ;
        BNC     p_strg_filter_calculations  ; fail if OLDP4ORD < P4CTR ;
        NEG     HSI_ACC+2                                              ;

;;;;;;;;;;;;;;;;;;;;;;;;;;;;;;;;;;;;;;;;;;;;;;;;;;;;;;;;;;;;;

;;;;;;;;;       Now find the zero crossing on flipper P4     ;;;;;;;;;
        ;;;;;;;;;    by linear interpolation if the opposite sign test ;;;;;;;;;
        ;;;;;;;;;         confirms that a zero crossing exits         ;;;;;;;;;

confirmed_P4_zero_crossing:                                            ;
        CMP     HSI_ACC+6, HSI_ACC+4            ;\                     ;
        BC      skip9                           ; > Determine numerator ;
        LD      HSI_ACC+6, HSI_ACC+4            ;/                     ;
        ORB     FLAGSET1, #00000010B            ; Set big tri. bit (big OLD) ;
skip9:                                                                 ;
        CLR     HSI_ACC                                                ;
        NORML   HSI_ACC, HSI_ACC+4              ; Normalize the denominator ;

SHL     HSI_ACC+6, HSI_ACC+4            ; Sub-normalize numerator ;
        CLR     HSI_ACC+4                                              ;

DIVU    HSI_ACC+4, HSI_ACC+2            ; Puts 'quotient' in ACC+4 ;
        SUB     HSI_ACC+6, NEW_TIME, OLD_P_TIME ; Calculate co-factor   ;
        MULU    HSI_ACC+4, HSI_ACC+6                                   ;
```

```
            BBS     HSI_ACC+5, 7, skip10                    ;
            INC     HSI_ACC+6                    ; PLM6 <== rounded('offset')  ;
skip10:                                                     ;
            SUB     INTRP_ZC_TIME, NEW_TIME, HSI_ACC+6   ; ZC <== Tnew - OFFSET  ;
            BBC     FLAGSET1, 1, P4_Output       ; Branch if big NEW tri.;
            ADD     INTRP_ZC_TIME, OLD_P_TIME, HSI_ACC+6 ; ZC <== Told - OFFSET  ;

;;;;;;;;   Now output the P4 flipper command   ;;;;;;;;;;;;;;;;;;;;;;
                                                            ;
P4_Output:                                                  ;
            DI                                              ;
            BBC     IOS0, 7, P4_command          ; Check CAM-file holding  ;
            EI                                   ; register status         ;
            BR      P4_Output                    ; Loop until free         ;
P4_command:                                                 ;
            LDB     HSO_COMMAND, #00100000B      ; Set P4 (+slope)         ;
            BBC     FLAGSET1, 0, skip11          ; Slope bit               ;
            LDB     HSO_COMMAND, #00000000B      ; Clear P4=1 (-slope)     ;
skip11:                                                     ;
            ADD     P4_LATCH_TIME, INTRP_ZC_TIME, #1000D   ; Delay (2.0msec)  ;

SUB     HSI_ACC, P4_LATCH_TIME, #8D  ; Check if there is still ;
            SUB     HSI_ACC, TIMER1              ; time to set P4 at the   ;
            BBC     HSI_ACC+1, 7, skip12         ; desired time.           ;
            ADD     HSO_TIME, TIMER1, #3         ; If late, do it now      ;
            BR      p_strg_filter_calculations                             ;
skip12:                                                     ;
            LD      HSO_TIME, P4_LATCH_TIME                                ;

;;;;;;;;;;;;;;;;;;;;;;;;;;;;;;;;;;;;;;;;;;;;;;;;;;;;;;;;;;;;;;;;;

;   ****************   PITCH  POST-FILTER  CALCULATIONS   ********************

;;;;;;;;;;;;  Pitch steering post-filter calculations  ;;;;;;;;;;;;;
            ;;;;;;;;;;;;    ( skip this set until first motion )   ;;;;;;;;;;;;
                                                            ;
            ;;;;;;;;   First find PSDU2_IN   ;;;;;;;;;;;;;;;;;;;;;;;;;;;;;;;;;  ;
                                                            ;  ;
p_strg_filter_calculations:                                 ;  ;
            EI                                              ;  ;
                                                            ;  ;
            MULU    HSI_ACC, P_S_UNDRDMP_OUT, #59672D    ; (59,672/65,536)   ;  ;
            MULU    PSDU2_IN, P_S_UNDRDMP_OUT+2, #59672D ; =(.5)*1.821037597 ;  ;
            ADD     PSDU2_IN, HSI_ACC+2                     ;  ;
            ADDC    PSDU2_IN+2, ZERO                        ;  ;
                                                            ;  ;
            ADD     PSDU2_IN, P_S_UNDRDMP_IN     ; Add the fil. input     ;  ;
            ADDC    PSDU2_IN+2, P_S_UNDRDMP_IN+2 ; to the value from above ;  ;
                                                            ;  ;
            SHRL    PSDU1_IN, #1                            ;  ;
            SUB     PSDU2_IN, PSDU1_IN           ; Cut PSDU1_IN in half    ;  ;
            SUBC    PSDU2_IN+2, PSDU1_IN+2       ; and subtract from above ;  ;
            BC      skip_it1                                ;  ;
                                                            ;  ;
skip_it1:                                                   ;  ;
            SHLL    PSDU2_IN, #1                 ; PSDU2_IN complete !!!   ;  ;

;;;;;;;;   Now find PSDU1_IN   ;;;;;;;;;;;;;;;;;;;;;;;;;;;;;;;;;  ;
                                                            ;  ;
            MULU    HSI_ACC, P_S_UNDRDMP_OUT, #58227D    ; (58,227/65,536)   ;  ;
            MULU    PSDU1_IN, P_S_UNDRDMP_OUT+2, #58227D ;   = 0.888469217  ;  ;
            ADD     PSDU1_IN, HSI_ACC+2                     ;  ;
            ADDC    PSDU1_IN+2, ZERO                        ;  ;

SUB     PSDU1_IN, P_S_UNDRDMP_IN     ; Sub. fil. input from above ;  ;
            SUBC    PSDU1_IN+2, P_S_UNDRDMP_IN+2 ; to get PSDU1_IN            ;  ;
            LD      OLD_P2_ORD, NEW_P2_ORD       ; Update old ordinates       ;  ;
            LD      OLD_P4_ORD, NEW_P4_ORD                  ;  ;
            BR      pitch_time_update                       ;  ;

;;;;;;;;;;;;;;;;;;;;;;;;;;;;;;;;;;;;;;;;;;;;;;;;;;;;;;;;;;;;;;;;;

;;;;;;;;;;;;  Pitch balance post-filter calculations  ;;;;;;;;;;;;;
            ;;;;;;;;;;;;    ( skip this set after first motion )   ;;;;;;;;;;;;
                                                            ;
```

;;;;;;;     First find PBDU1_IN     ;;;;;;;;;;;;;;;;;;;;;;;;;;;;;;;

pitch_post_balance_calculations:
        MULU    HSI_ACC, P_B_OVRDMP_OUT, #42795D      ; (42,795/65,536)
        MULU    PBDU1_IN, P_B_OVRDMP_OUT+2, #42795D   ; = 0.5*1.306005
        ADD     PBDU1_IN, HSI_ACC+2
        ADDC    PBDU1_IN+2, ZERO
        SHLL    PBDU1_IN, #1                          ; PBDU1_IN * 2

MULU    HSI_ACC, P_B_OVRDMP_IN, #24022D       ; (24,022/65,536)
        MULU    HSI_ACC+4, P_B_OVRDMP_IN+2, #24022D   ; = 0.3665462
        ADD     HSI_ACC+4, HSI_ACC+2
        ADDC    HSI_ACC+6, ZERO

ADD     PBDU1_IN, HSI_ACC+4                   ; Add in value from above
        ADDC    PBDU1_IN+2, HSI_ACC+6

SUB     PBDU1_IN, PBDU2_IN                    ; Subtract PBDU2_IN to get
        SUBC    PBDU1_IN+2, PBDU2_IN+2                ;   PBDU1_IN ;;;;;;;     Now find PBDU2_IN     ;;;;;;;;;;;;;;;;;;;;;;;;;;;;;;;

MULU    HSI_ACC, P_B_OVRDMP_OUT, #29131D      ; (29,131/65,536)
        MULU    PBDU2_IN, P_B_OVRDMP_OUT+2, #29131D   ;     =0.4445078
        ADD     PBDU2_IN, HSI_ACC+2
        ADDC    PBDU2_IN+2, ZERO

MULU    HSI_ACC, P_B_OVRDMP_IN, #41514D       ; (41,514/65,536)
        MULU    HSI_ACC+4, P_B_OVRDMP_IN+2, #41514D   ; = 0.6334539
        ADD     HSI_ACC+4, HSI_ACC+2
        ADDC    HSI_ACC+6, ZERO

ADD     PBDU2_IN, HSI_ACC+4                   ; Add in the value from above;
        ADDC    PBDU2_IN+2, HSI_ACC+6                 ;  to get PBDU2_IN ;;;;;;;     Now find PBDU3_IN     ;;;;;;;;;;;;;;;;;;;;;;;;;;;;;;;

MULU    HSI_ACC, P_B_UNDRDMP_OUT, #45290D     ; (45,290/65,536)
        MULU    PBDU3_IN, P_B_UNDRDMP_OUT+2, #45290D  ; =(.5)*1.382152
        ADD     PBDU3_IN, HSI_ACC+2
        ADDC    PBDU3_IN+2, ZERO
        SHLL    PBDU3_IN, #1                          ; PBDU3_IN * 2

LD      HSI_ACC, P_B_UNDRDMP_IN               ; Get the filter input
        LD      HSI_ACC+2, P_B_UNDRDMP_IN+2
        SHLL    HSI_ACC, #1                           ; Filter input * 2
        ADD     PBDU3_IN, HSI_ACC                     ; Add in value from above
        ADDC    PBDU3_IN+2, HSI_ACC+2                 ;  to PBDU3_IN SUB     PBDU3_IN, PBDU4_IN                    ; Subtract PBDU4_IN to get
        SUBC    PBDU3_IN+2, PBDU4_IN+2                ;   PBDU3_IN ;;;;;;;     Now find PBDU4_IN     ;;;;;;;;;;;;;;;;;;;;;;;;;;;;;;;

MULU    HSI_ACC, P_B_UNDRDMP_OUT, #35001D     ; (35,001/65,536)
        MULU    PBDU4_IN, P_B_UNDRDMP_OUT+2, #35001D  ;    =.5340734
        ADD     PBDU4_IN, HSI_ACC+2
        ADDC    PBDU4_IN+2, ZERO

SUB     PBDU4_IN, P_B_UNDRDMP_IN              ; Sub. fil. input from above
        SUBC    PBDU4_IN+2, P_B_UNDRDMP_IN+2          ;  to get PBDU4_IN

;;;;;;;;;;;;;;;;;;;;;;;;;;;;;;;;;;;;;;;;;;;;;;;;;;;;;;;;;;;;;;;;;;

;;;;;;;;;;;;;;;;;     Now update the times and exit     ;;;;;;;;;;;;;;;;;

pitch_time_update:
        LD      OLD_P_TIME, NEW_TIME
        BR      ysx_check
```

;;;;;;;;;;;;;;;;;;;;;;;;;;;;;;;;;;;;;;;;;;;;;;;;;;;;;;;;;;;;;;;;;;;

;;;;;;;;;;;;;;;;;;;;;;;;;;;;;;    Yaw Channel    ;;;;;;;;;;;;;;;;;;;;;;;;;;;;;;;;;;;
;;;;;;;;;;;;;;;;;;;;;;;;;;;;;;                    ;;;;;;;;;;;;;;;;;;;;;;;;;;;;;;;;;;;
;;;;;;;;;;;;;;;;;;;;;;;;;;;;;;                    ;;;;;;;;;;;;;;;;;;;;;;;;;;;;;;;;;;;

```
y_chnl_strg_or_bal:
        BBS     FLAGSET1, 7, skip_D2            ; If 1st motion then skip next in
        ORB     INT_MASK, #00100000B            ; Unmask ST
skip_D2:
        EI BBS     FLAGSET2, 1, not_1st_ybx        ; Check for first yaw trans.
        LD      OLD_Y_TIME, NEW_TIME            ; Store time of 1st yaw trans.
        ORB     FLAGSET2, #00000010B            ; Set 'bit'
        BR      exit_routine
                ; Execute the next instructions for all but
                ; the first yaw transition.

not_1st_ybx:
        LD      HSI_ACC+4, #18432D              ; Numerator = 32,000,000
        LD      HSI_ACC+6, #488D                ;           = 500,000*2^6
        SUB     DELTA_T1, NEW_TIME, OLD_Y_TIME  ; Find time difference (timer1
                                                ; increments) between tran's.

;;;;;;;;;;;;;;;;;   Hard limit the inputs   ;;;;;;;;;;;;;;;;;;;;;;;;;
                                                                            ;
        CMP     DELTA_T1, #510D                 ; Glitch protection         ;
        BC      skip13                          ;  ~980Hz                   ;
        CMP     DELTA_T1, #658D                 ;  ~760HZ                   ;
        BH      skip13                          ;                           ;
        LD      OLD_Y_TIME, NEW_TIME            ; Update old time           ;
        BR      exit_routine                    ; Ignore bad data           ;
skip13:                                                                     ;
        CMP     DELTA_T1, #526D                 ; Check the upper band limit;
        BC      skip_14                         ;  ~950Hz                   ;
        LD      DELTA_T1, #526D                                             ;
skip_14:                                                                    ;
        CMP     DELTA_T1, #633D                 ; Check the lower band limit;
        BNH     skip15                          ;  ~790Hz                   ;
        LD      DELTA_T1, #633D                                             ;
                                                                            ;
        ;;;;;;;;;;;;;;;;;;;;;;;;;;;;;;;;;;;;;;;;;;;;;;;;;;;;;;;;;;;;;;;;;;;;;
skip15:
        DIVU    HSI_ACC+4, DELTA_T1             ; Finds yaw frq. @ 2^6 lsb/Hz ;;;;;;;;  Extend the Yaw frequency to 32 bits   ;;;;;;;;;;;;;;;;;;;;
                                                                            ;
        LD      HSI_ACC+10, HSI_ACC+4           ; Transfer upper word       ;
                                                                            ;
        CMP     HSI_ACC+6, ZERO                 ; Execute for zero remainder;
        BNE     y_32bit_extension               ;                           ;
        CLR     HSI_ACC+8                       ;                           ;
        BR      y_check_for_1st_motion          ;                           ;
y_32bit_extension:                                                          ;
        CLR     HSI_ACC                         ; Extend scaled filter (freq.);
        NORML   HSI_ACC, HSI_ACC+8              ;  input to 32 bits by      ;
        SHL     HSI_ACC+6, HSI_ACC+8            ;  restoring the remainder. ;
        CLR     HSI_ACC+4                       ;                           ;
        DIVU    HSI_ACC+4, HSI_ACC+2            ;                           ;
        LD      HSI_ACC+8, HSI_ACC+4            ;                           ;
                                                                            ;
        ;;;;;;;;;;;;;;;;;;;;;;;;;;;;;;;;;;;;;;;;;;;;;;;;;;;;;;;;;;;;;;;;;;;;;

y_check_for_1st_motion:
        LD      Y_FREQ_VALUE, HSI_ACC+8         ; Transfer for steering
        LD      Y_FREQ_VALUE+2, HSI_ACC+10      ;

BBS     FLAGSET1, 7, y_chnl_strg        ; Branch after 1st motion
```

;;;;;;;;;;;;;;;;;;;;;;;;;;;;;;                        ;;;;;;;;;;;;;;;;;;;;;;;;;;;;;;;;;;;
;;;;;;;;;;;;;;;;;;;;;;;;;;;;;;    Yaw Channel Balance  ;;;;;;;;;;;;;;;;;;;;;;;;;;;;;;;;;;;
;;;;;;;;;;;;;;;;;;;;;;;;;;;;;;                        ;;;;;;;;;;;;;;;;;;;;;;;;;;;;;;;;;;;

```
;;;;;;;;  Hard limit the input frequency for BALANCE  ;;;;;;;;;;;;;;;
                                                                        ;
        CMP     HSI_ACC+10, #54400D        ; Check the lower band limit ;
        BC      skip16                     ;  ~850Hz                    ;
        LD      HSI_ACC+10, #54400D                                     ;
        LD      HSI_ACC+8, #00000D                                      ;
skip16:                                                                 ;
        CMP     HSI_ACC+10, #56960D        ; Check the upper band limit ;
        BNH     subtract_yb_offset         ;  ~890Hz                    ;
        LD      HSI_ACC+10, #56960D                                     ;
        LD      HSI_ACC+8, #00000D                                      ;

;;;;;;;;  Subtract off constant offset and scale up  ;;;;;;;;;;;;;;;
                                                                        ;
subtract_yb_offset:                                                     ;
        SUB     HSI_ACC+8, #00000D                                      ;
        SUBC    HSI_ACC+10, #53760D        ; 53,760 = 840 Hz @ 2^6      ;
                                                                        ;
        SHLL    HSI_ACC+8, #3              ; Mult. by 8 to get          ;
                                           ;  offset deltaF at 2^9     ;

; ****************  Execute the BALANCE filter:  **********************
; ************  4 POLE 1 ZERO low pass (40 Hz. cutoff)  ***************

;;;;;;;;  Scale and save the filter input for later  ;;;;;;;;;;;;;;;
                                                                        ;
        MULU    HSI_ACC, HSI_ACC+8, #8458D ; The offset deltaF becomes  ;
        MULU    HSI_ACC+4, HSI_ACC+10, #8458D ; the filter input        ;
        ADD     HSI_ACC+4, HSI_ACC+2                                    ;
        ADDC    HSI_ACC+6, ZERO            ; (offset deltaF)*0.1290575  ;

LD      Y_B_OVRDMP_IN, HSI_ACC+4   ; Save the filter input      ;
        LD      Y_B_OVRDMP_IN+2, HSI_ACC+6 ;                            ;

;;;;;;;  Find 1st 2 pole filter output Vc = 40 Hz, Zeta = 0.9  ;;;;;;;
                                                                        ;
        ADD     HSI_ACC+4, YBDU1_IN        ; This forms the overdamped output ;
        ADDC    HSI_ACC+6, YBDU1_IN+2      ; which goes into the underdamped fil.;

LD      Y_B_OVRDMP_OUT, HSI_ACC+4  ; Save the overdamped output ;
        LD      Y_B_OVRDMP_OUT+2, HSI_ACC+6 ; for post-filter calcs.    ;

;;;;;;;  Find 2nd 2 pole filter output Vc = 40 Hz, Zeta = 0.7  ;;;;;;;
                                                                        ;
        MULU    HSI_ACC, HSI_ACC+4, #18113D ; (18,113/65,536)*0.0625 =  ;
        MULU    HSI_ACC+4, HSI_ACC+6, #18113D ;          .01727383      ;
        ADD     HSI_ACC+4, HSI_ACC+2                                    ;
        ADDC    HSI_ACC+6, ZERO            ; This forms the underdamped ;
        SHRL    HSI_ACC+4, #4              ; filter input               ;

LD      Y_B_UNDRDMP_IN, HSI_ACC+4  ; Save the underdamped input ;
        LD      Y_B_UNDRDMP_IN+2, HSI_ACC+6 ; for post-filter calcs.    ;

ADD     HSI_ACC+4, YBDU3_IN        ; This forms the underdamped output ;
        ADDC    HSI_ACC+6, YBDU3_IN+2      ; ( = 4 pole filter output ) ;

LD      Y_B_UNDRDMP_OUT, HSI_ACC+4 ; Save the underdamped output ;
        LD      Y_B_UNDRDMP_OUT+2, HSI_ACC+6 ; for post-filter calcs.   ;
        SHLL    HSI_ACC+4, #1              ; Scale up to 2^10           ;

;;;;;;;;  Find the absolute value of deltaF  ;;;;;;;;;;;;;;;;;;;;;;;
                                                                        ;
        ANDB    FLAGSET1, #11111011B       ; Clear Balance sign bit (+) ;
        SUB     HSI_ACC+4, #6350D          ; Subtract the 29.943454Hz @ 2^10;
        SUBC    HSI_ACC+6, #30662D         ;  offset to get deltaF (@ 2^10) ;

BC      hard_limit_yb_deltaF                                    ;
        NOT     HSI_ACC+4                  ; Take the absolute value    ;
        NOT     HSI_ACC+6                  ;  of deltaF and set bit     ;
        ADD     HSI_ACC+4, #1                                           ;
        ADDC    HSI_ACC+6, ZERO                                         ;
```

```
        ORB     FLAGSET1, #00000100B        ;                                ;

;;;;;;;;;;;;;;;;  Hard-limit the error frequency  ;;;;;;;;;;;;;;;;;
                                                                             ;
hard_limit_yb_deltaF:                                                        ;
        CMP     HSI_ACC+6, #6336D           ; Check magnitude of deltaF      ;
        BNC     scale_yb_deltaF                                              ;
        LD      HSI_ACC+6, #6336D           ; | deltaF | < 6.2 Hz  (@ 2^10)  ;
        LD      HSI_ACC+4, ZERO                                              ;

;;;;;;;;  Convert deltaF to BALANCE code and output  ;;;;;;;;;;;;;;;
scale_yb_deltaF:                                                             ;
        MULU    HSI_ACC, HSI_ACC+4, #39140D  ; (39,140/65,536) * 2^5         ;
        MULU    HSI_ACC+4, HSI_ACC+6, #39140D ; = 0.597222222 * 2^5          ;
        ADD     HSI_ACC+4, HSI_ACC+2         ; = 19.11111111                 ;
        ADDC    HSI_ACC+6, ZERO              ; (deltaF) *.597222222 (@ 2^5) ;
                                                                             ;
        SHLL    HSI_ACC+4, #3                ; Mulitiply by 8 (@ 2^8)        ;
                                                                             ;
        LD      HSI_ACC, #32768D             ; Load Balance center value     ;
                                             ;   128 (@ 2^8)                 ;
        BBS     FLAGSET1, 2, neg_yb_deltaF                                   ;
        SUB     HSI_ACC, HSI_ACC+6           ; Execute for +deltaF           ;
        BC      form_yb_output_byte                                          ;
        LD      HSI_ACC, ZERO                                                ;
        BR      form_yb_output_byte                                          ;
                                                                             ;
neg_yb_deltaF:                                                               ;
        ADD     HSI_ACC, HSI_ACC+6           ; Execute for -deltaF           ;
                                                                             ;
form_yb_output_byte:                                                         ;
        SHR     HSI_ACC, #8                  ; Scale down to 2^0             ;
        BNC     yb_output                                                    ;
        INCB    HSI_ACC                      ; Round up if necessary         ;
yb_output:                                                                   ;
        BBS     FLAGSET1, 7, y_chnl_strg     ; Skip after 1st motion         ;
        DI                                                                   ;
        ORB     IOPORT2, #00100000B          ; Select yaw channel (P2.5)     ;
        LDB     BALANCE_IMAGE_W0+1, HSI_ACC  ; Transfer high order byte.     ;
        ST      BALANCE_IMAGE_W0, BALANCE_PORT ; Output the balance value    ;
        EI                                                                   ;
        BBC     FLAGSET1, 7, yaw_post_balance_calculations ; Skip steering   ;
                                                           ; till 1st motion ;

;;;;;;;;;;;;;;;;;;;;;;;;;;;;;;;             ;;;;;;;;;;;;;;;;;;;;;;;;;;;;;;;
;;;;;;;;;;;;;;;;;;;;;;;;;;;;;;; Yaw channel steering ;;;;;;;;;;;;;;;;;;;;;;;;
;;;;;;;;;;;;;;;;;;;;;;;;;;;;;;;             ;;;;;;;;;;;;;;;;;;;;;;;;;;;;;;;

y_chnl_strg:

;;;;;;;;  Subtract off constant offset and scale up  ;;;;;;;;;;;;;;;
                                                                            ;.
        LD      HSI_ACC+8, Y_FREQ_VALUE      ; Transfer to working           ;
        LD      HSI_ACC+10, Y_FREQ_VALUE+2   ; registers                     ;
                                                                             ;
        SUB     HSI_ACC+8, #00000D                                           ;
        SUBC    HSI_ACC+10, #46080D          ; 46,080 = 720 Hz @ 2^6         ;
                                                                             ;
                                                                             ;
        ; Note:  Scale up to (1.5)*2^6 is incorporated below                 ;
                                                                             ;
;   ****************  Execute the STEERING filter:  ********************
;   *********************     4 POLE 1 ZERO       ************************
;   * (2-1st ord. low pass cascaded with 2nd ord. underdamped low pass) *

;;;;;;;;;;;;;;;  Scale the filter input for first stage  ;;;;;;;;;;;;;
                                                                             ;
        MULU    HSI_ACC+4, HSI_ACC+8, #28875D ; The offset deltaF becomes    ;
        MULU    HSI_ACC+8, HSI_ACC+10, #28875D ;   the filter input          ;
        ADD     HSI_ACC+8, HSI_ACC+6                                         ;
        ADDC    HSI_ACC+10, ZERO             ; (offset deltaF @ (1.5)*2^6)   ;
                                             ;     * 0.2937278477            ;

;;;;;;;;;;;;;;;;;;;  1st order low pass Wp = 109 Hz  ;;;;;;;;;;;;;;;
                                                                             ;
```

```
;;;;;;;;    First find YSDU4_IN    ;;;;;;;;;;;;;;;;;;;;;;;;;;;;;;;

MULU    HSI_ACC, YSDU4_OUT, #27037D       ; (27,037/65,536)
MULU    HSI_ACC+4, YSDU4_OUT+2, #27037D   ;   = 0.4125443046
ADD     HSI_ACC+4, HSI_ACC+2
ADDC    HSI_ACC+6, ZERO                   ; 0.4125 * YSDU4_OUT

ADD     HSI_ACC+4, HSI_ACC+8              ; Add in the input to get
ADDC    HSI_ACC+6, HSI_ACC+10             ; new YSDU4_IN ;;;;;;;;    Now find the output and update the state variable    ;;;;

ADD     HSI_ACC+8, HSI_ACC+4, YSDU4_OUT   ;
LD      HSI_ACC+10, HSI_ACC+6
ADDC    HSI_ACC+10, YSDU4_OUT+2           ; Output @ 1.5 * 2^6

LD      YSDU4_OUT, HSI_ACC+4              ; Update YSDU4_OUT
LD      YSDU4_OUT+2, HSI_ACC+6            ; for next time

;;;;;;;;;;;;;;;;;;;;;;;;;;;;;;;;;;;;;;;;;;;;;;;;;;;;;;;;;;;;;;;;;;;;

;;;;;;;;;;;;    Scale the filter input for second stage    ;;;;;;;;;;;;

MULU    HSI_ACC+4, HSI_ACC+8, #21040D     ; Scale down to 1.5 * 2^5
MULU    HSI_ACC+8, HSI_ACC+10, #21040D    ; and scale second stage input
ADD     HSI_ACC+8, HSI_ACC+6              ;    * 0.6420997919
ADDC    HSI_ACC+10, ZERO ;;;;;;;;;;;;    1 pole 1 zero filter Vp = 30 Hz, Vz = 50 Hz    ;;;;;;;;;;;;

;;;;;;;;    First find YSDU3_IN    ;;;;;;;;;;;;;;;;;;;;;;;;;;;;;;;

MULU    HSI_ACC, YSDU3_OUT, #51896D       ; (51,896/65,536)
MULU    HSI_ACC+4, YSDU3_OUT+2, #51896D   ;   = 0.7918665571
ADD     HSI_ACC+4, HSI_ACC+2
ADDC    HSI_ACC+6, ZERO                   ; 0.7919 * YSDU3_OUT

ADD     HSI_ACC+4, HSI_ACC+8              ; Add in the input to get
ADDC    HSI_ACC+6, HSI_ACC+10             ; new YSDU3_IN ;;;;;;;;    Now find the output and update the state variable    ;;;;

MULU    HSI_ACC, YSDU3_OUT, #44293D       ; (44,293/65,536)
MULU    HSI_ACC+8, YSDU3_OUT+2, #44293D   ;   = 0.6758549908
ADD     HSI_ACC+8, HSI_ACC+2
ADDC    HSI_ACC+10, ZERO                  ; 0.6759 * YSDU3_OUT

SUB     HSI_ACC, HSI_ACC+4, HSI_ACC+8     ;
LD      HSI_ACC+2, HSI_ACC+6
SUBC    HSI_ACC+2, HSI_ACC+10             ; Output @ 1.5 * 2^5

LD      YSDU3_OUT, HSI_ACC+4              ; Update YSDU3_OUT
LD      YSDU3_OUT+2, HSI_ACC+6            ; for next time

;;;;;;;;;;;;;;;;;;;;;;;;;;;;;;;;;;;;;;;;;;;;;;;;;;;;;;;;;;;;;;;;;;;;

;;;;;;;;    Now execute the 2nd order underdamped filter    ;;;;;;;;;;;;

;;;;;;;;    First scale and save the input    ;;;;;;;;;;;;;;;;;;;;;

MULU    HSI_ACC+4, HSI_ACC, #28554D       ; (28,554/65,536) / 4
MULU    HSI_ACC+8, HSI_ACC+2, #28554D     ;   =.02723145663
ADD     HSI_ACC+8, HSI_ACC+6              ; scaled up to 1.5 * 2^7
ADDC    HSI_ACC+10, ZERO
SHRL    HSI_ACC+8, #2                     ; Divide by 4

LD      Y_S_UNDRDMP_IN, HSI_ACC+8         ; Save the underdamped
LD      Y_S_UNDRDMP_IN+2, HSI_ACC+10      ; fil. input for later ;;;;;;;;    Find, clamp, scale and save the output    ;;;;;;;;;;;;

ADD     HSI_ACC+8, YSDU2_IN               ; Offset deltaF (@ 1.5*2^7);
ADDC    HSI_ACC+10, YSDU2_IN+2            ;    = FILTER OUTPUT !!!

CMP     HSI_ACC+10, #13440D               ; Check the lower band
BC      chk_yaw_upper_limit               ;  limit ~790Hz
```

```
                LD      HSI_ACC+8, ZERO
                LD      HSI_ACC+10, #13440D         ; (790 - 720) * 1.5*2^7      ;   ;
chk_yaw_upper_limit:
                CMP     HSI_ACC+10, #44160D         ; Check the upper band       ;   ;
                BNH     save_yaw_filter_output      ;    limit ~950Hz            ;   ;
                LD      HSI_ACC+8, ZERO                                          ;   ;
                LD      HSI_ACC+10, #44160D         ; (950 - 720) * 1.5*2^7      ;   ;
                                                                                 ;   ;
save_yaw_filter_output:
                LD      Y_S_UNDRDMP_OUT, HSI_ACC+8     ; Save the underdamped    ;   ;
                LD      Y_S_UNDRDMP_OUT+2, HSI_ACC+10  ; fil. output for later   ;   ;
                                                                                 ;   ;
                SHRL    HSI_ACC+8, #3               ; Scale down to 1.25*2^4     ;   ;
                MULU    HSI_ACC+8, HSI_ACC+10, #54613D ;                = 20.0   ;   ;
                                                                                 ;   ;
                BBC     HSI_ACC+9, 7, combine_y_strg_with_gyro                   ;   ;
                INC     HSI_ACC+10                  ; Round if necessary         ;   ;
                                                                                 ;
;;;;;;;;;;;;;;;;;;;;;;;;;;;;;;;;;;;;;;;;;;;;;;;;;;;;;;;;;;;;;;;;;;;;;;;;;;;;;

combine_y_strg_with_gyro:
                ADD     HSI_ACC+10, #29768D     ; First add in centering constant
                                                ; (32,767 - 29,768 + (149.9Hz @ 1.25*2^-4))

MULU    HSI_ACC, RGV, #23613D   ; Convert RGV scaled for pitch steering
                                                ;   to RGV scaled for yaw steering:
                                                ;       (23,613/65,536) =
                                                ;       (.73167/.6346)*(1.25)*2^(-2)

SUB     NEW_Y1_ORD, HSI_ACC+10, HSI_ACC+2   ; Combine YAW steering
                ADD     NEW_Y3_ORD, HSI_ACC+10, HSI_ACC+2   ;  and ROLL gyro ;;;;;;;;  Now combine both Y1 and Y3 ordinates with YAW gyro   ;;;;;;;
                ;;;;;;;;    but not if the Yaw Damping Disable signal          ;;;;;;;
                ;;;;;;;;             has been recieved                         ;;;;;;;
                                                                                 ;
                BBS     FLAGSET1, 3, Y1_opposite_sign_test  ; Br. if YDD bit set  ;
                                                                                 ;
                BBS     FLAGSET1, 4, negative_YGV           ; Check the sign of YGV ;
                ADD     NEW_Y1_ORD, YGV                     ; Exec. for positive YGV ;
                ADD     NEW_Y3_ORD, YGV                     ;                     ;
                BR      Y1_opposite_sign_test                                    ;
                                                                                 ;
negative_YGV:
                SUB     NEW_Y1_ORD, YGV                     ; Exec. for negative YGV ;
                SUB     NEW_Y3_ORD, YGV                     ;                     ;
                ;;;;;;;;    Check to see whether or not Y1 has crossed          ;;;;;;;
                ;;;;;;;;    the "zero" axis by applying the opposite sign test  ;;;;;;;
                ;;;;;;;;    to the new Y1 ordinate and the old Y1 ordinate      ;;;;;;;
                                                                                 ;
Y1_opposite_sign_test:
                ANDB    FLAGSET1, #11111100B        ; Clear slope (+slope) and   ;
                                                    ; big triangle (big NEW) bits;
                SUB     HSI_ACC+2, NEW_Y1_ORD, OLD_Y1_ORD   ; Determine slope    ;
                BE      Y3_opposite_sign_test       ; No ZC if NEWY1ORD=OLDY1ORD ;
                BNC     negative_Y1_slope                                        ;
                                                                                 ;
                SUB     HSI_ACC+6, NEW_Y1_ORD, Y1_CENTER                         ;
                BNH     Y3_opposite_sign_test       ; fail if NEWY1ORD <= Y1CTR  ;
                SUB     HSI_ACC+4, Y1_CENTER, OLD_Y1_ORD                         ;
                BNE     around5                                                  ;
                LD      INTRP_ZC_TIME, OLD_Y_TIME                                ;
                BR      Y1_Output                                                ;
around5:
                BNC     Y3_opposite_sign_test       ; fail if OLDY1ORD > Y1CTR   ;
                BR      confirmed_Y1_zero_crossing                               ;
negative_Y1_slope:
                ORB     FLAGSET1, #00000001B        ; Set slope bit (-slope)     ;
                SUB     HSI_ACC+6, Y1_CENTER, NEW_Y1_ORD                         ;
                BNH     Y3_opposite_sign_test       ; fail if NEWY1ORD >= Y1CTR  ;
                SUB     HSI_ACC+4, OLD_Y1_ORD, Y1_CENTER                         ;
                BNE     around6                                                  ;
                LD      INTRP_ZC_TIME, OLD_Y_TIME                                ;
                BR      Y1_Output                                                ;
around6:
                BNC     Y3_opposite_sign_test       ; fail if OLDY1ORD < Y1CTR   ;
                NEG     HSI_ACC+2                                                ;
                                                                                 ;
;;;;;;;;;;;;;;;;;;;;;;;;;;;;;;;;;;;;;;;;;;;;;;;;;;;;;;;;;;;;;;;;;;;;;;;;;;;;;
```

;;;;;;;;        Now find the zero crossing on flipper Y1      ;;;;;;;;
;;;;;;;;     by linear interpolation if the opposite sign test  ;;;;;;;;;
;;;;;;;;         confirms that a zero crossing exits          ;;;;;;;;;

confirmed_Y1_zero_crossing:
        CMP     HSI_ACC+6, HSI_ACC+4            ;\
        BC      skip17                          ; > Determine numerator
        LD      HSI_ACC+6, HSI_ACC+4            ;/
        ORB     FLAGSET1, #00000010B            ; Set big tri. bit (big OLD)
skip17:
        CLR     HSI_ACC
        NORML   HSI_ACC, HSI_ACC+4              ; Normalize the denominator SHL     HSI_ACC+6, HSI_ACC+4            ; Sub-normalize numerator
        CLR     HSI_ACC+4

DIVU    HSI_ACC+4, HSI_ACC+2            ; Puts 'quotient' in HSI_ACC+4;
        SUB     HSI_ACC+6, NEW_TIME, OLD_Y_TIME ; Calculate co-factor
        MULU    HSI_ACC+4, HSI_ACC+6
        BBC     HSI_ACC+5, 7, skip18
        INC     HSI_ACC+6                       ; HSIACC6 <== rounded('offset')
skip18:
        SUB     INTRP_ZC_TIME, NEW_TIME, HSI_ACC+6    ; ZC <== Tnew - OFFSET
        BBC     FLAGSET1, 1, Y1_Output          ; Branch if big NEW tri.
        ADD     INTRP_ZC_TIME, OLD_Y_TIME, HSI_ACC+6  ; ZC <== Told - OFFSET

;;;;;;;;;;;;;;;;;;;;;;;;;;;;;;;;;;;;;;;;;;;;;;;;;;;;;;;;;;;;;;;;;;;;;;;;;;

;;;;;;;;        Now output the Y1 flipper command        ;;;;;;;;;;;;;;;;;;;;

Y1_Output:
        DI
        BBC     IOS0, 7, Y1_command             ; Check CAM-file holding
        EI                                      ;   register status
        BR      Y1_Output                       ; Loop until free
Y1_command:
        LDB     HSO_COMMAND, #00100001B         ; Set Y1 (+slope)
        BBC     FLAGSET1, 0, skip19             ; Slope bit
        LDB     HSO_COMMAND, #00000001B         ; Clear Y1=1 (-slope)
skip19:
        ADD     Y1_LATCH_TIME, INTRP_ZC_TIME, #1000D ; Delay (2.0msec)

SUB     HSI_ACC, Y1_LATCH_TIME, #8D     ; Check if there is still
        SUB     HSI_ACC, TIMER1                 ; time to set Y1 at the
        BBC     HSI_ACC+1, 7, skip20            ; desired time.
        ADD     HSO_TIME, TIMER1, #3            ; If late, do it now
        BR      Y3_opposite_sign_test
skip20:
        LD      HSO_TIME, Y1_LATCH_TIME

;;;;;;;;;;;;;;;;;;;;;;;;;;;;;;;;;;;;;;;;;;;;;;;;;;;;;;;;;;;;;;;;;;;;;;;;;;

;;;;;;;;        Check to see whether or not Y3 has crossed      ;;;;;;;;
;;;;;;;;     the "zero" axis by applying the opposite sign test  ;;;;;;;;
;;;;;;;;     to the new Y3 ordinate and the old Y3 ordinate     ;;;;;;;;

Y3_opposite_sign_test:
        EI
        ANDB    FLAGSET1, #11111100B            ; Clear slope (+slope) and
                                                ;  big triangle (big NEW) bits
        SUB     HSI_ACC+2, NEW_Y3_ORD, OLD_Y3_ORD    ; Determine slope
        BE      y_strg_filter_calculations      ; No ZC if NEWY3ORD=OLDY3ORD
        BNC     negative_Y3_slope SUB     HSI_ACC+6, NEW_Y3_ORD, Y3_CENTER
        BNH     y_strg_filter_calculations      ; fail if NEWY3ORD <= Y3CTR
        SUB     HSI_ACC+4, Y3_CENTER, OLD_Y3_ORD
        BNE     around7
        LD      INTRP_ZC_TIME, OLD_Y_TIME
        BR      Y3_Output
around7:
        BNC     y_strg_filter_calculations      ; fail if OLDY3ORD > Y3CTR
        BR      confirmed_Y3_zero_crossing
negative_Y3_slope:
        ORB     FLAGSET1, #00000001B            ; Set slope bit (-slope)
        SUB     HSI_ACC+6, Y3_CENTER, NEW_Y3_ORD
        BNH     y_strg_filter_calculations      ; fail if NEWY3ORD >= Y3CTR

```
        SUB     HSI_ACC+4, OLD_Y3_ORD, Y3_CENTER          ;
        BNE     around8                                    ;
        LD      INTRP_ZC_TIME, OLD_Y_TIME                  ;
        BR      Y3_Output                                  ;
around8:                                                   ;
        BNC     y_strg_filter_calculations   ; fail if OLDY3ORD < Y3CTR  ;
        NEG     HSI_ACC+2                                  ;
                                                           ;

;;;;;;;;;;;;;;;;;;;;;;;;;;;;;;;;;;;;;;;;;;;;;;;;;;;;;;;;;;;;;;;;;;;;;;;;

;;;;;;;;     Now find the zero crossing on flipper Y3     ;;;;;;;;;
        ;;;;;;;;   by linear interpolation if the opposite sign test  ;;;;;;;;;
        ;;;;;;;;         confirms that a zero crossing exits       ;;;;;;;;;
                                                           ;
confirmed_Y3_zero_crossing:                                ;
        CMP     HSI_ACC+6, HSI_ACC+4             ;\        ;
        BC      skip21                           ; > Determine numerator ;
        LD      HSI_ACC+6, HSI_ACC+4             ;/        ;
        ORB     FLAGSET1, #00000010B             ; Set big tri. bit (big OLD) ;
skip21:                                                    ;
        CLR     HSI_ACC                                    ;
        NORML   HSI_ACC, HSI_ACC+4               ; Normalize the denominator ;

SHL     HSI_ACC+6, HSI_ACC+4             ; Sub-normalize numerator ;
        CLR     HSI_ACC+4                                  ;

DIVU    HSI_ACC+4, HSI_ACC+2             ; Puts 'quotient' in HSI_ACC+4;
        SUB     HSI_ACC+6, NEW_TIME, OLD_Y_TIME  ; Calculate co-factor ;
        MULU    HSI_ACC+4, HSI_ACC+6                       ;
        BBS     HSI_ACC+5, 7, skip22                       ;
        INC     HSI_ACC+6                        ; HSIACC6 <== rounded('offset') ;
skip22:                                                    ;
        SUB     INTRP_ZC_TIME, NEW_TIME, HSI_ACC+6   ; ZC <== Tnew - OFFSET ;
        BBC     FLAGSET1, 1, Y3_Output           ; Branch if big NEW tri. ;
        ADD     INTRP_ZC_TIME, OLD_Y_TIME, HSI_ACC+6  ; ZC <== Told - OFFSET ;

;;;;;;;;   Now output the Y3 flipper command    ;;;;;;;;;;;;;;;;;;;;
                                                           ;
Y3_Output:                                                 ;
        DI                                                 ;
        BBC     IOS0, 7, Y3_command              ; Check CAM-file holding ;
        EI                                       ;   register status     ;
        BR      Y3_Output                        ; Loop until free       ;
Y3_command:                                                ;
        LDB     HSO_COMMAND, #00000011B          ; Clear Y3-1 (+slope)   ;
        BBC     FLAGSET1, 0, skip23              ; Slope bit             ;
        LDB     HSO_COMMAND, #00100011B          ; Set Y3 (-slope)       ;
skip23:                                                    ;
        ADD     Y3_LATCH_TIME, INTRP_ZC_TIME, #1000D  ; Delay (2.0msec) ;

SUB     HSI_ACC, Y3_LATCH_TIME, #8D      ; Check if there is still ;
        SUB     HSI_ACC, TIMER1                  ; time to set Y3 at the ;
        BBC     HSI_ACC+1, 7, skip24             ; desired time.         ;
        ADD     HSO_TIME, TIMER1, #3             ; If late, do it now    ;
        BR      y_strg_filter_calculations                 ;
skip24:                                                    ;
        LD      HSO_TIME, Y3_LATCH_TIME                    ;

;;;;;;;;;;;;;;;;;;;;;;;;;;;;;;;;;;;;;;;;;;;;;;;;;;;;;;;;;;;;;;;;;;;;;;;;;

; **************  YAW   POST-FILTER  CALCULATIONS  ******************

;;;;;;;;;;;;    Yaw steering post-filter calculations    ;;;;;;;;;;;;;
        ;;;;;;;;;;;;        ( skip this set until first motion )   ;;;;;;;;;;;;;

;;;;;;;;    First find YSDU2_IN   ;;;;;;;;;;;;;;;;;;;;;;;;;;;;;;;;;

y_strg_filter_calculations:                                ;
        EI                                                 ;

MULU    HSI_ACC, Y_S_UNDRDMP_OUT, #57265D      ; (57,265/65,536)  ;
        MULU    YSDU2_IN, Y_S_UNDRDMP_OUT+2, #57265D   ; =(.5)*1.747591372 ;
        ADD     YSDU2_IN, HSI_ACC+2                        ;
        ADDC    YSDU2_IN+2, ZERO                           ;
```

```
            ADD     YSDU2_IN, Y_S_UNDRDMP_IN     ; Add the fil. input
            ADDC    YSDU2_IN+2, Y_S_UNDRDMP_IN+2 ; to the value from above SHRL    YSDU1_IN, #1
            SUB     YSDU2_IN, YSDU1_IN           ; Cut YSDU1_IN in half
            SUBC    YSDU2_IN+2, YSDU1_IN+2       ; and subtract from above
            BC      skip_it2 skip_it2:
            SHLL    YSDU2_IN, #1                 ; * 2 = YSDU2_IN

;;;;;;;;  Now find YSDU1_IN   ;;;;;;;;;;;;;;;;;;;;;;;;;;;;;;;;

MULU    HSI_ACC, Y_S_UNDRDMP_OUT, #56132D    ; (56,132/65,536)
            MULU    YSDU1_IN, Y_S_UNDRDMP_OUT+2, #56132D ;   = 0.8565171987
            ADD     YSDU1_IN, HSI_ACC+2
            ADDC    YSDU1_IN+2, ZERO

SUB     YSDU1_IN, Y_S_UNDRDMP_IN     ; Sub. fil. input from above
            SUBC    YSDU1_IN+2, Y_S_UNDRDMP_IN+2 ; to get YSDU1_IN
            LD      OLD_Y1_ORD, NEW_Y1_ORD       ; Update the old ordinates
            LD      OLD_Y3_ORD, NEW_Y3_ORD
            BR      yav_time_update ;;;;;;;;;;;;    Yaw balance post-filter calculations   ;;;;;;;;;;;;;
            ;;;;;;;;;;;;    ( skip this set after first motion )   ;;;;;;;;;;;;;

;;;;;;;;  First find YBDU1_IN   ;;;;;;;;;;;;;;;;;;;;;;;;;;;;;;;;

yaw_post_balance_calculations:
            MULU    HSI_ACC, Y_B_OVRDMP_OUT, #50098D    ; (50,098/65,536)
            MULU    YBDU1_IN, Y_B_OVRDMP_OUT+2, #50098D ;   = .5*1.528878
            ADD     YBDU1_IN, HSI_ACC+2
            ADDC    YBDU1_IN+2, ZERO
            SHLL    YBDU1_IN, #1                 ; YBDU1_IN * 2

MULU    HSI_ACC, Y_B_OVRDMP_IN, #16543D    ; (16,543/65,536)
            MULU    HSI_ACC+4, Y_B_OVRDMP_IN+2, #16543D ;  = 0.252422
            ADD     HSI_ACC+4, HSI_ACC+2
            ADDC    HSI_ACC+6, ZERO

ADD     YBDU1_IN, HSI_ACC+4          ; Add in value from above
            ADDC    YBDU1_IN+2, HSI_ACC+6

SUB     YBDU1_IN, YBDU2_IN           ; Subtract YBDU2_IN from above
            SUBC    YBDU1_IN+2, YBDU2_IN+2       ; to get YBDU1_IN ;;;;;;;;  Now find YBDU2_IN   ;;;;;;;;;;;;;;;;;;;;;;;;;;;;;;;;

MULU    HSI_ACC, Y_B_OVRDMP_OUT, #38930D    ; (38,930/65,536)
            MULU    YBDU2_IN, Y_B_OVRDMP_OUT+2, #38930D ;  =.5940315
            ADD     YBDU2_IN, HSI_ACC+2
            ADDC    YBDU2_IN+2, ZERO

MULU    HSI_ACC, Y_B_OVRDMP_IN, #48993D    ; (48,993/65,536)
            MULU    HSI_ACC+4, Y_B_OVRDMP_IN+2, #48993D ;  = 0.7475788
            ADD     HSI_ACC+4, HSI_ACC+2
            ADDC    HSI_ACC+6, ZERO

ADD     YBDU2_IN, HSI_ACC+4          ; Add in the value from above;
            ADDC    YBDU2_IN+2, HSI_ACC+6        ; to get YBDU2_IN ;;;;;;;;  Now find YBDU3_IN   ;;;;;;;;;;;;;;;;;;;;;;;;;;;;;;;;

MULU    HSI_ACC, Y_B_UNDRDMP_OUT, #52376D    ; (52,376/65,536)
            MULU    YBDU3_IN, Y_B_UNDRDMP_OUT+2, #52376D ;  =(.5)*1.598382
            ADD     YBDU3_IN, HSI_ACC+2
            ADDC    YBDU3_IN+2, ZERO
            SHLL    YBDU3_IN, #1                 ; YBDU3_IN * 2

LD      HSI_ACC, Y_B_UNDRDMP_IN      ; Get the filter input
            LD      HSI_ACC+2, Y_B_UNDRDMP_IN+2
            SHLL    HSI_ACC, #1                  ; Filter input * 2
            ADD     YBDU3_IN, HSI_ACC            ; Add in value from above
            ADDC    YBDU3_IN+2, HSI_ACC+2        ; to YBDU3_IN
```

```
        SUB     YBDU3_IN, YBDU4_IN          ; Subtract YBDU4_IN to get    ;  ;
        SUBC    YBDU3_IN+2, YBDU4_IN+2      ;  YBDU3_IN                   ;  ;
                                                                             ;
;;;;;;;;       Now find YBDU4_IN   ;;;;;;;;;;;;;;;;;;;;;;;;;;;;;;;;;;;;;   ;
                                                                             ;
        MULU    HSI_ACC, Y_B_UNDRDMP_OUT, #43744D   ; (43,744/65,536)      ;  ;
        MULU    YBDU4_IN, Y_B_UNDRDMP_OUT+2, #43744D ;      =.6674774      ;  ;
        ADD     YBDU4_IN, HSI_ACC+2                                       ;  ;
        ADDC    YBDU4_IN+2, ZERO                                          ;  ;
                                                                             ;
        SUB     YBDU4_IN, Y_B_UNDRDMP_IN    ; Sub. filter input           ;  ;
        SUBC    YBDU4_IN+2, Y_B_UNDRDMP_IN+2 ; to get YBDU4_IN             ;  ;
                                                                             ;
;;;;;;;;;;;;;;;;;;;;;;;;;;;;;;;;;;;;;;;;;;;;;;;;;;;;;;;;;;;;;;;;;;;;;;;;;;

;;;;;;;;;;;;;;;;;   Now update the times and exit  ;;;;;;;;;;;;;;;;;
                                                                     ;
yaw_time_update:                                                     ;
        LD      OLD_Y_TIME, NEW_TIME                                 ;
        BR      exit_routine                                         ;
                                                                     ;
;;;;;;;;;;;;;;;;;;;;;;;;;;;;;;;;;;;;;;;;;;;;;;;;;;;;;;;;;;;;;;;;;;;;;

$ EJECT
$ TITLE("A TO D CONVERSION INTERUPT SERVICE ROUTINE")

;AD_CONVR  MODULE

; This I.S.R. receives and converts analog signals on lines P0.2 (ROLL
; GYRO) and P0.1 (YAW GYRO) into 10 bit digital numbers.  (The sampling
; rates are 300Hz on each channel, and the conversions are staggered.
; Thus, once gyro sampling begins the sequence of events proceeds as
; follows:   Sample and process roll channel -- wait 1.67msec -- sample
; and process yaw channel -- wait 1.67msec -- sample and process roll
; channel -- wait 1.67msec -- sample and ....)  After the A/D conversion
; occurs on a given channel the raw digital number is transferred to a
; working register and scaled to serve as input to the channel's gyro
; filter.  After filtering the output is then rescaled and stored for
; future use with steering information in the HSI DATA AVAILABLE module.
;
; Before gyro filtering occurs the gyro input values must be calibrated.
; This is done in the gyro calibration routine at the end of this module.
; Sixteen samples on each channel (ROLL and YAW) are taken.  The average
; of these samples becomes the respective ROLL and YAW gyro center values
; to which the steering center values and the gyro filter intermediate
; values are tuned.
;
;;;;;;;;;;;;;;;;;;;;;;;;;;;;;;;;;;;;;;;;;;;;;;;;;;;;;;;;;;;;;;;;;;;;;;;;;

Roll_Yaw_gyro:

PUSHF

BBS     FLAGSET1, 5, calibrate_the_gyros  ; Calibrate if ROLL bit set
        BBS     FLAGSET1, 6, calibrate_the_gyros  ; Calibrate if YAW bit set ;;;;;;;;;;;;;;;;;;;;;;;;;;;;;;;;;;;;;;;;;;;;;;;;;;;;;;;;;;;;;;;;;;;;;;;;;
;                                                                       ;
;                   G Y R O      F I L T E R I N G                      ;
;                                                                       ;
;;;;;;;;;;;;;;;;;;;;;;;;;;;;;;;;;;;;;;;;;;;;;;;;;;;;;;;;;;;;;;;;;;;;;;;;;

LDB     INT_MASK, #00000100B        ; Enable HSI_D_A
        BBS     FLAGSET1, 7, skip_D1A       ; If first motion then skip next
        ORB     INT_MASK, #00100000B        ; Unmask ST
skip_D1A:
        ORB     IOS1_IMAGE, IOS1            ; Get TIMER1 overflow status
        BBC     IOS1_IMAGE, 5, chk_ROLL_or_YAW ; Check if it overflowed
        INCB    TIMER1_OVRFLW_CNT           ; Inc count of TIMER1 overflows
        ANDB    IOS1_IMAGE, #11011111B      ; Clear TIMER1 overflow bit
``` chk_ROLL_or_YAW:
    EI
    BBC    AD_RESULT_lo, 1, YAW_A_to_D

```
;;;;;;;;;;;;;;;;;;;;;;;;;;;              ;;;;;;;;;;;;;;;;;;;;;;;;;;;
;;;;;;;;;;;;;;;;;;;;;;;;;;;  ROLL CHANNEL ;;;;;;;;;;;;;;;;;;;;;;;;;;;
;;;;;;;;;;;;;;;;;;;;;;;;;;;              ;;;;;;;;;;;;;;;;;;;;;;;;;;;

;;;;;;; First mold and scale the ROLL GYRO filter input  ;;;;;;;

ROLL_A_to_D:
        LDB     AD_ACC+8, AD_RESULT_lo     ; Load the "prescaled" AD result
        LDB     AD_ACC+9, AD_RESULT_hi     ; (see MCS-96 users guide for
                                           ;  AD_RESULT format)
        SHR     AD_ACC+8, #4
        ANDB    AD_ACC+8, #11111100B       ; AD_ACC+8 = Filter input
                                           ; = 4 * ("unscaled" AD result)
                                           ; increments) between tran's.

;***** Now filter the input  **************************************

;;;;;;;; First find RGDU1_IN  ;;;;;;;;;;;;;;;;;;;;;;;;;;;;;;;;;;;
                                                                            ;
        MULU    AD_ACC, RGDU1_OUT, #17755D                                  ;
        MULU    AD_ACC+4, RGDU1_OUT+2, #17755D                              ;
        ADD     AD_ACC+4, AD_ACC+2         ; AD_ACC+4 <==                   ;
        ADDC    AD_ACC+6, ZERO             ;        .271 * RGDU1_OUT        ;
                                                                            ;
        LD      RGDU1_IN, AD_ACC+4                                          ;
        ADD     RGDU1_IN+2, AD_ACC+6, AD_ACC+8  ; RGDU1_IN complete!!!      ;
                                                                            ;
        ;;;;;;;;;;;;;;;;;;;;;;;;;;;;;;;;;;;;;;;;;;;;;;;;;;;;;;;;;;;;;;;;;;

;;;;;;;; Now find RGDU2_IN  ;;;;;;;;;;;;;;;;;;;;;;;;;;;;;;;;;;;;;
                                                                            ;
        MULU    AD_ACC, RGDU2_OUT, #42663D     ; AD_ACC+4 <==               ;
        MULU    AD_ACC+4, RGDU2_OUT+2, #42663D ;        .651 * RGDU2_OUT    ;
        ADD     AD_ACC+4, AD_ACC+2                                          ;
        ADDC    AD_ACC+6, ZERO                                              ;
                                                                            ;
        ADD     AD_ACC+4, RGDU1_OUT             ; Add in RGDU1_OUT          ;
        ADDC    AD_ACC+6, RGDU1_OUT+2                                       ;
        ADD     RGDU2_IN, RGDU1_IN, AD_ACC+4    ; Add in RGDU1_IN           ;
        LD      RGDU2_IN+2, RGDU1_IN+2                                      ;
        ADDC    RGDU2_IN+2, AD_ACC+6            ; RGDU2_IN complete!!!      ;
                                                                            ;
        ;;;;;;;;;;;;;;;;;;;;;;;;;;;;;;;;;;;;;;;;;;;;;;;;;;;;;;;;;;;;;;;;;;

;;;;;;;; Now find RGDU3_IN  ;;;;;;;;;;;;;;;;;;;;;;;;;;;;;;;;;;;;;
                                                                            ;
        MULU    AD_ACC, RGDU2_OUT, #31694D      ; (31,694/65,536) =         ;
        MULU    AD_ACC+4, RGDU2_OUT+2, #31694D  ;    0.030225316*2^4        ;
        ADD     AD_ACC+4, AD_ACC+2                                          ;
        ADDC    AD_ACC+6, ZERO                                              ;
                                                                            ;
        SHRL    AD_ACC+4, #4                    ; Divide by 2^4 and round   ;
        ADDC    AD_ACC+4, ZERO                  ; AD_ACC+4 <==              ;
        ADDC    AD_ACC+6, ZERO                  ;   0.030225316*RGDU2_OUT   ;
                                                                            ;
        MULU    AD_ACC, RGDU3_OUT, #65431D                                  ;
        MULU    AD_ACC+8, RGDU3_OUT+2, #65431D                              ;
        ADD     AD_ACC+8, AD_ACC+2              ; AD_ACC+8 <==              ;
        ADDC    AD_ACC+10, ZERO                 ;    .99839*RGDU3_OUT       ;
                                                                            ;
        SUB     AD_ACC+8, AD_ACC+4              ; AD_ACC+8 <== (.998*RGDU3_OUT ;
        SUBC    AD_ACC+10, AD_ACC+6             ;     -.0302*RGDU2_OUT)     ;
                                                                            ;
        LD      RGDU3_IN, RGDU2_IN                                          ;
        LD      RGDU3_IN+2, RGDU2_IN+2          ; Transfer RGDU2_IN         ;
```

```
            SHRL    RGDU3_IN, #5                        ; and divide by 32                   ;
            ADD     RGDU3_IN, AD_ACC+8                                                       ;
            ADDC    RGDU3_IN+2, AD_ACC+10               ; RGDU3_IN complete!!!               ;
                                                                                             ;
            ;;;;;;;;;;;;;;;;;;;;;;;;;;;;;;;;;;;;;;;;;;;;;;;;;;;;;;;;;;;;;;;;;;;;
            ;;;;;;;;     Now find the filter output    ;;;;;;;;;;;;;;;;;;;;;;;;;;
            MULU    AD_ACC, RGDU3_OUT, #64883D          ; (64,883/65,536) =                  ;
            MULU    AD_ACC+4, RGDU3_OUT+2, #64883D      ;    0.9900397589                    ;
            ADD     AD_ACC+4, AD_ACC+2                  ; AD_ACC+4 <==                       ;
            ADDC    AD_ACC+6, ZERO                      ;    0.9900397589*RGDU3_OUT          ;

CMP     RGDU3_IN+2, AD_ACC+6                ; Chk for possible underflow         ;
            BH      positive_filter_output              ; Branch if no underflow             ;
            LD      AD_ACC, ZERO                        ; Hard limit filter output           ;
            LD      AD_ACC+2, ZERO                      ; to zero                            ;
            BR      scale_roll_output                                                        ;
                                                                                             ;
positive_filter_output:                                                                      ;
            LD      AD_ACC+2, RGDU3_IN+2                                                     ;
            SUB     AD_ACC, RGDU3_IN, AD_ACC+4          ; Subtract from RGDU3_IN to          ;
            SUBC    AD_ACC+2, AD_ACC+6                  ; get the filter OUTPUT              ;
                                                                                             ;
            ;;;;;;;;;;;;;;;;;;;;;;;;;;;;;;;;;;;;;;;;;;;;;;;;;;;;;;;;;;;;;;;;;;;;
            ;***   Now scale the output to match the steering output   ******** scale_roll_output:
            MULU    AD_ACC+4, AD_ACC, #39746D
            MULU    AD_ACC+8, AD_ACC+2, #39746D         ; (39,746/65,536) =
            ADD     AD_ACC+8, AD_ACC+6                  ;    0.606479832
            ADDC    AD_ACC+10, ZERO SHLL    AD_ACC+8, #7                        ; * 128 = 77.62941857
                                                        ; AD_ACC+10 <==
                                                        ;   FIL. OUTPUT * 77.62941857

;;;;;;;;     Hard limit RGV and load for steering    ;;;;;;;;;;;;;;;;
                                                                                             ;
            CMP     AD_ACC+10, #20500D                  ; Upper limit needed to              ;
            BNC     skip_it1A                           ; protect against strg.              ;
            LD      AD_ACC+10, #20500D                  ; calculation overflow               ;
skip_it1A:                                                                                   ;
            LD      RGV, AD_ACC+10                      ; Load for steering                  ;

;;;;;;;;     Update the state variables     ;;;;;;;;;;;;;;;;;;;;;;;;;
                                                                                             ;
            LD      RGDU2_OUT, RGDU2_IN                                                      ;
            LD      RGDU2_OUT+2, RGDU2_IN+2                                                  ;
            LD      RGDU1_OUT, RGDU1_IN                                                      ;
            LD      RGDU1_OUT+2, RGDU1_IN+2                                                  ;
            LD      RGDU3_OUT, RGDU3_IN                                                      ;
            LD      RGDU3_OUT+2, RGDU3_IN+2                                                  ;
                                                                                             ;
            ;;;;;;;;;;;;;;;;;;;;;;;;;;;;;;;;;;;;;;;;;;;;;;;;;;;;;;;;;;;;;;;;;;;;
            ;;;;;;;    Set up next conversion and exit   ;;;;;;;;;;;;;;;;;;;;;;;

BBC     IOPORT1, 3, YDDclr                  ; Look for YDD signal                ;
            ANDB    FLAGSET1, #11110111B                ; Clear bit if no YDD signal         ;
            LDB     YDD_DELAY_CNT, #YDD_DELAY           ; Reset the Ydd delay count          ;
                                                        ; to 36 msec                         ;
YDDclr:                                                                                      ;
            LDB     AD_COMMAND, #00000001B              ; Pgrm. A/D for yaw gyro,            ;
            BBC     FLAGSET1, 3, skip3A                 ; (unless YDD bit is set)            ;
            LDB     AD_COMMAND, #00000010B              ; or roll gyro                       ;
skip3A:                                                                                      ;
            DI                                                                               ;
            BBC     IOSO, 6, around1A                   ; Check CAM-file status              ;
            EI                                                                               ;
            BR      skip3A                              ; Loop until free                    ;
around1A:                                                                                    ;
            LDB     HSO_COMMAND, #00011111B             ; Command to start A/D               ;
            ADD     AD_TIME_KEEPER, #833D               ; 833 T1l's = 1/(2*300Hz)            ;
            BBC     FLAGSET1, 3, skip4A                 ; (If YDD bit set, then              ;
            ADD     AD_TIME_KEEPER, #834D               ; 1667 T1l's = 1/300Hz)              ;
skip4A:                                                                                      ;
```

```
                SUB     AD_ACC+2, AD_TIME_KEEPER, TIMER1        ;
                BBC     AD_ACC+3, 7, skip5A                     ;
                LD      AD_TIME_KEEPER, TIMER1                  ;
skip5A:                                                         ;
                ADD     HSO_TIME, AD_TIME_KEEPER, #4            ;
                EI                                              ;
                NOP                                             ;
                                                                ;
                POPF                                            ;
                RET                                             ;
                                                                ;

;;;;;;;;;;;;;;;;;;;;;;;;;;;;;;;;;;;;;;;;;;;;;;;;;;;;;;;;;;;;;;;;

;;;;;;;;;;;;;;;;;;;;;;;;;;;;            ;;;;;;;;;;;;;;;;;;;;;;;;
;;;;;;;;;;;;;;;;;;;;;;;;;;;;    YAW     CHANNEL.    ;;;;;;;;;;;;;;;;;;;;;;;;
;;;;;;;;;;;;;;;;;;;;;;;;;;;;            ;;;;;;;;;;;;;;;;;;;;;;;;

YAW_A_to_D:
                LDB     RAW_AD_VALUE_lo, AD_RESULT_lo
                LDB     RAW_AD_VALUE_hi, AD_RESULT_hi

SHR     RAW_AD_VALUE, #5
                ANDB    RAW_AD_VALUE, #11111110B                ; RAW_AD_VALUE = filter input
                                                                ; increments) between tran's.

;***** Now filter the input ***********************************

;;;;;;;; First find YGDU1_IN ;;;;;;;;;;;;;;;;;;;;;;;;;;;;;;;;;;;;

MULU    AD_ACC, YGDU1_OUT, #36845D              ;
                MULU    AD_ACC+4, YGDU1_OUT+2, #36845D          ;
                ADD     AD_ACC+4, AD_ACC+2                      ; AD_ACC+4 <==
                ADDC    AD_ACC+6, ZERO                          ;       .562*YGDU1_OUT

LD      YGDU1_IN, AD_ACC+4                      ;
                ADD     YGDU1_IN+2, AD_ACC+6, RAW_AD_VALUE      ; YGDU1_IN complete!!!
                                                                ;

;;;;;;;;;;;;;;;;;;;;;;;;;;;;;;;;;;;;;;;;;;;;;;;;;;;;;;;;;;;;;;;;

;;;;;;;; Now find YGDU2_IN ;;;;;;;;;;;;;;;;;;;;;;;;;;;;;;;;;;;;;
                                                                ;
                MULU    AD_ACC, YGDU2_OUT, #46326               ; AD_ACC+4 <==
                MULU    AD_ACC+4, YGDU2_OUT+2, #46326           ;       .707 * YGDU2_OUT
                ADD     AD_ACC+4, AD_ACC+2                      ;
                ADDC    AD_ACC+6, ZERO                          ;

ADD     AD_ACC+4, YGDU1_OUT                     ; Add in YGDU1_OUT
                ADDC    AD_ACC+6, YGDU1_OUT+2                   ;
                ADD     YGDU2_IN, YGDU1_IN, AD_ACC+4            ; Add in YGDU1_IN
                LD      YGDU2_IN+2, YGDU1_IN+2                  ;
                ADDC    YGDU2_IN+2, AD_ACC+6                    ; YGDU2_IN complete!!!
                                                                ;

;;;;;;;;;;;;;;;;;;;;;;;;;;;;;;;;;;;;;;;;;;;;;;;;;;;;;;;;;;;;;;;;

;;;;;;;; Now find YGDU3_IN ;;;;;;;;;;;;;;;;;;;;;;;;;;;;;;;;;;;;;
                                                                ;
                MULU    AD_ACC, YGDU2_OUT, #60290D              ; (60,290/65,536) =
                MULU    AD_ACC+4, YGDU2_OUT+2, #60290D          ;       .9199555258
                ADD     AD_ACC+4, AD_ACC+2                      ;
                ADDC    AD_ACC+6, ZERO                          ;
                SHRL    AD_ACC+4, #3                            ;

MULU    AD_ACC, YGDU3_OUT, #65078D              ;
                MULU    AD_ACC+8, YGDU3_OUT+2, #65078D          ;
                ADD     AD_ACC+8, AD_ACC+2                      ; AD_ACC+8 <==
                ADDC    AD_ACC+10, ZERO                         ;       .99301*YGDU3_OUT

SUB     AD_ACC+8, AD_ACC+4                      ; AD_ACC+8 <== (.9199*YGDU2_OUT
                SUBC    AD_ACC+10, AD_ACC+6                     ;       -.9930*YGDU3_OUT)

LD      YGDU3_IN, YGDU2_IN                      ;
                LD      YGDU3_IN+2, YGDU2_IN+2                  ;
                SHRL    YGDU3_IN, #3                            ;
                ADD     YGDU3_IN, AD_ACC+8                      ;
                ADDC    YGDU3_IN+2, AD_ACC+10                   ; YGDU3_IN complete!!!
                                                                ;

;;;;;;;;;;;;;;;;;;;;;;;;;;;;;;;;;;;;;;;;;;;;;;;;;;;;;;;;;;;;;;;;
```

```
;;;;;;;;    Now find the filter output    ;;;;;;;;;;;;;;;;;;;;;;;;;
        LD      AD_ACC, YGDU3_IN                                        ;
        LD      AD_ACC+2, YGDU3_IN+2      ; Subtract YGDU3_OUT           ;
        SUB     AD_ACC, YGDU3_OUT         ; from YGDU3_IN to get         ;
        SUBC    AD_ACC+2, YGDU3_OUT+2     ; the FILTER OUTPUT            ;

;;;;;;;;;;;;;;;;;;;;;;;;;;;;;;;;;;;;;;;;;;;;;;;;;;;;;;;;;;;;;;;;;;;;

;;;;;;;;    Now scale and take the absolute value of the    ;;;;;;;;;;;;
;;;;;;;;         output to match the steering output        ;;;;;;;;;;;;

DI
        ANDB    FLAGSET1, #11101111B       ; Clr YGV sign bit (+slope)
        BBC     AD_ACC+3, 7, skip8A
        ORB     FLAGSET1, #00010000B       ; Set YGV sign bit (-slope)
        NOT     AD_ACC
        NOT     AD_ACC+2
        ADD     AD_ACC, #1
        ADDC    AD_ACC+2, ZERO             ; ACC <-- | FIL. OUTPUT |
skip8A:
        SHLL    AD_ACC, #5
        MULU    AD_ACC+4, AD_ACC, #38797D  ; 32 * (38,797/65,536)
        MULU    AD_ACC+8, AD_ACC+2, #38797D ; = 18.94407552
        ADD     AD_ACC+8, AD_ACC+6
        ADDC    AD_ACC+10, ZERO            ; | FIL. OUTPUT | * 18.94407552

;;;;;;;;    Hard limit YGV and load for steering    ;;;;;;;;;;;;;;;;;;
                                                                        ;
        CMP     AD_ACC+10, #21450D         ; Upper limit needed to      ;
        BNC     skip_it2A                  ;  protect against strg.     ;
        LD      AD_ACC+10, #21450D         ;  calculation overflow      ;
skip_it2A:
        LD      YGV, AD_ACC+10             ; Store the scaled filter    ;
                                           ; output in YGV for steering ;

; *********   Now look for the Yaw Damping Disable signal  ***********
                                                                        ;
        BBC     FLAGSET1, 7, noYDD         ; Don't allow YDD until 1st motion;
        BBS     IOPORT1, 3, noYDD          ; Look for YDD signal         ;
        DECB    YDD_DELAY_CNT              ; Delay time less 3.3 msec    ;
        BNE     noYDD                      ; Branch if delay not through ;
        ORB     FLAGSET1, #00001000B       ; Set YDD bit if found        ;
        LD      YGV, ZERO                  ;  and load YGV with zero     ;
noYDD:
        EI                                 ; Ready for steering          ;

;;;;;;;;    Update the state variables    ;;;;;;;;;;;;;;;;;;;;;;;;;;;

LD      YGDU2_OUT, YGDU2_IN                                     ;
        LD      YGDU2_OUT+2, YGDU2_IN+2                                 ;
        LD      YGDU1_OUT, YGDU1_IN                                     ;
        LD      YGDU1_OUT+2, YGDU1_IN+2                                 ;
        LD      YGDU3_OUT, YGDU3_IN                                     ;
        LD      YGDU3_OUT+2, YGDU3_IN+2                                 ;

;;;;;;;;;;;;;;;;;;;;;;;;;;;;;;;;;;;;;;;;;;;;;;;;;;;;;;;;;;;;;;;;;;;;

;;;;;;;    Set up next ROLL GYRO conversion and exit    ;;;;;;;;;;;;;;
                                                                        ;
        LDB     AD_COMMAND, #00000010B     ; Pgrm. A/D for roll gyro     ;
Program_ROLL_A_to_D:                                                    ;
        DI
        BBC     IOS0, 6, around2A          ; Check CAM-file status       ;
        EI
        BR      Program_ROLL_A_to_D                                     ;
around2A:
        LDB     HSO_COMMAND, #00011111B    ; Command to start A/D        ;
        ADD     AD_TIME_KEEPER, #834D      ; 834 T1i's = 1/(2*300Hz)     ;
        SUB     AD_ACC+2, AD_TIME_KEEPER, TIMER1                        ;
        BBC     AD_ACC+3, 7, skip10A                                    ;
        LD      AD_TIME_KEEPER, TIMER1                                  ;
skip10A:
        ADD     HSO_TIME, AD_TIME_KEEPER, #4                            ;
        EI                                                              ;
        NOP                                                             ;
```

```
        POPF
        RET
        ADD     AD_TIME_KEEPER, TIMER1, #50D        ; 100 us from now.
        LD      HSO_TIME, AD_TIME_KEEPER POPF                                         ; Exit
        RET
```

$ EJECT
$ TITLE("SOFTWARE TIMERS INTERRUPT SERVICE ROUTINE")
;SWTIM      MODULE
; This interrupt service routine is used to set a bit to indicate when 30 msec
; has passed since power up reset. This service routine is called only once,
; 30 msec after power up reset.
;
;;;;;;;;;;;;;;;;;;;;;;;;;;;;;;;;;;;;;;;;;;;;;;;;;;;;;;;;;;;;;;;;;;;;;;;;;

```
software_timers_ISR:

PUSHF
        ORB     IOS1_IMAGE, IOS1            ; Get IOS1 status
check_bit1:
        BBS     IOS1_IMAGE, 1, st1          ; Check for soft timer1 done:
        POPF
        RET

;;;;;;;;;;;;;;;;;;   Software Timer 0: Flipper alignment  ;;;;;;;;;;;;;;;;;;

st0:
        LDB     HSO_COMMAND, #00100110B     ; Set HSO.0 and HSO.1, turn
        ADD     HSO_TIME, TIMER1, #3        ;  off P4 and Y1 flippers.
        LDB     HSO_COMMAND, #00100111B     ; Set HSO.2 and HSO.3, turn
        ADD     HSO_TIME, TIMER1, #3        ;  off P2 and Y3 flippers.
        ANDB    IOS1_IMAGE, #11111110B      ; Clear ST0 flag.
        BR      check_bit1

;;;;;;;;;;;;;;;;;;   Software Timer 1:   30 ms Flag  ;;;;;;;;;;;;;;;;;;;;;;

st1:
        ORB     FLAGSET2, #00000100B        ; Set 30 ms bit
        ANDB    IOS1_IMAGE, #11111101B      ; Clear ST1 flag.
        BR      done
```

$ EJECT
$ TITLE("FIRST MOTION SUBROUTINE")
;FIRST_MOTION MODULE
; This subroutine senses 1st motion which is defined as a pitch frequency
; more than 10 Hz off from the pitch center frequency. When 1st motion is
; detected, this routine changes the pitch channel interrupt polarity from
; negative transitions only, to both positive and negative transitions. This
; effectivly increases the pitch sampling rate from ~560 Hz to ~1120 Hz.
;
; The subroutine also clears the gyro calibration bits to stop gyro calibration
; if calibration has not yet stopped. Stopping calibration in this way leaves

;;;;;;;;;;;;;;;;;;;;;;;;;;;;;;;;;;;;;;;;;;;;;;;;;;;;;;;;;;;;;;;;;;;;;;;;;

;;;;;;;;;;;;;;;;;;;;;;;;;;;;;;;;;;;;;;;;;;;;;;;;;;;;;;;;;;;;;;;;;;;;;;;;;
;                                                                       ;
;                    G Y R O    C A L I B R A T I O N                   ;
;                                                                       ;
;;;;;;;;;;;;;;;;;;;;;;;;;;;;;;;;;;;;;;;;;;;;;;;;;;;;;;;;;;;;;;;;;;;;;;;;;
```
calibrate_the_gyros:
        BBC     AD_RESULT_lo, 1, YAW_cal
```

;;;;;;;;;;;;;;;;;;;;;;;;;;;
;;;;;;;;;;;;;;;;;;;;;;;;;;;    Roll gyro calibration    ;;;;;;;;;;;;;;;;;;;;;;;;;;;
;;;;;;;;;;;;;;;;;;;;;;;;;;;

```
ROLL_cal:
        CMPB    R_CAL_CNTR, ZERO                ; Check for 1st pass
        BH      get_TIMER1_statusA
        LD      R_CAL_ACC, ZERO                 ; Clr. accumulator initially
get_TIMER1_statusA:
        DI
        ORB     IOS1_IMAGE, IOS1                ; Get TIMER1 overflow status
        BBC     IOS1_IMAGE, 5, chk_R_cal_flag   ; Check if it overflowed
        INCB    TIMER1_OVRFLW_CNT               ; Inc count of TIMER1 overflow
        ANDB    IOS1_IMAGE, #11011111B          ; Clear TIMER1 overflow bit
chk_R_cal_flag:
        EI
        BBC     FLAGSET1, 5, set_up_next_YAW_conv ; Check if done w/ ROLL gyro c
        CMPB    TIMER1_OVRFLW_CNT, #5           ; Check if still time for gyro
        BC      default_ROLL_value              ; Skip if not enough time LDB     RAW_AD_VALUE_lo, AD_RESULT_lo   ; Get A/D value
        LDB     RAW_AD_VALUE_hi, AD_RESULT_hi
        SHR     RAW_AD_VALUE, #6                ; Shift out address bits CMP     RAW_AD_VALUE, #437D             ; Check if value is out of
        BNC     chk_done_R_cal                  ;  range, if so then ignore
        CMP     RAW_AD_VALUE, #586D             ;  it. (Range +- 9.18 deg.)
        BH      chk_done_R_cal                  ;  s.f. = 0.123641 deg./bit ADD     R_CAL_ACC, RAW_AD_VALUE         ; Add this to collection INCB    R_CAL_CNTR                      ; One more sample
        BR      chk_done_R_cal default_ROLL_value:
        LD      R_CAL_ACC, #8184D               ; Load default value
        ANDB    FLAGSET1, #11011111B            ; Clear ROLL cal bit chk_done_R_cal:
        CMPB    R_CAL_CNTR, #16D                ; Check for last value
        BC      cal_ROLL                        ;  (Branch if last value)
        BBS     FLAGSET1, 5, set_up_next_YAW_conv ; Check if done w/ ROLL gyro c ; ********** Execute below when 16 samples have been collected ****** cal_ROLL:
        ANDB    FLAGSET1, #11011111B            ; Clear ROLL cal bit
        MULU    AD_ACC+4, R_CAL_ACC, #63672D    ; Mult.by (63,672/65536)
                                                ;    = 15.54501693/16

LD      RGV, AD_ACC+6                   ; Update RGV

SUB     AD_ACC+6, #7951D                ; Sub. initial pitch RGV

;;;;;;;;    Calc. Pitch and Yaw steering center values   ;;;;;;;;;;;;;;;
;
        ADD     P2_CENTER, AD_ACC+6             ; Adjust pitch steering    ;
        SUB     P4_CENTER, AD_ACC+6             ;   center values          ;
                                                ;                          ;
        MULU    AD_ACC+4, R_CAL_ACC, #22941D    ; 22,941/65536=0.350055107 ;

SUB     AD_ACC+6, #2865D                ; Sub. initial yaw RGV     ;

SUB     Y1_CENTER, AD_ACC+6             ; Adjust yaw steering      ;
        ADD     Y3_CENTER, AD_ACC+6             ;   center values          ;

;;;;;;;;    Recalculate ROLL gyro filter intermediates   ;;;;;;;;;;;;;;;
;
        MULU    RGDU1_OUT, R_CAL_ACC, #22472D   ; Recalculate RGDU1_OUT    ;

LD      RGDU2_OUT, RGDU1_OUT            ; Recalculate              ;
        LD      RGDU2_OUT+2, RGDU1_OUT+2        ;     RGDU2_OUT            ;
        SHLL    RGDU2_OUT, #3                   ;                          ;
        MULU    RGDU2_OUT, RGDU2_OUT+2, #46943D ;                          ;

LD      RGDU3_OUT, RGDU2_OUT            ; Recalculate              ;
        LD      RGDU3_OUT+2, RGDU2_OUT+2        ;     RGDU3_OUT            ;
        MULU    RGDU3_OUT, RGDU3_OUT+2, #41895D ;                          ;
```

```
;;;;;;;;    Set up the next YAW gyro conversion   ;;;;;;;;;;;;;;;;;;;
                                                                    ;
set_up_next_YAW_conv:
        BBS     IOS0, 6, set_up_next_YAW_conv   ; Loop until CAM is free  ;
                                                                    ;
        LDB     AD_COMMAND, #00000001B          ; Pgrm. A/D for yaw gyro  ;
        LDB     HSO_COMMAND, #00011111B         ; Command to start A/D    ;
        ADD     AD_TIME_KEEPER, TIMER1, #50D    ; 100 us from now.        ;
        LD      HSO_TIME, AD_TIME_KEEPER                            ;

POPF                                    ; Exit
        RET

;;;;;;;;;;;;;;;;;;;;;;;;;;;;                ;;;;;;;;;;;;;;;;;;;;;;;;;;;;
;;;;;;;;;;;;;;;;;;;;;;;;;;;;   Yaw gyro calibration  ;;;;;;;;;;;;;;;;;;;;;;;;;;;;
;;;;;;;;;;;;;;;;;;;;;;;;;;;;                ;;;;;;;;;;;;;;;;;;;;;;;;;;;;

YAW_cal:
        CMPB    Y_CAL_CNTR, ZERO                ; Check for 1st pass
        BH      get_TIMER1_statusB
        LD      Y_CAL_ACC, ZERO                 ; Clr. accumulator initially
get_TIMER1_statusB:
        DI
        ORB     IOS1_IMAGE,IOS1                 ; Get TIMER1 overflow status
        BBC     IOS1_IMAGE, 5, chk_Y_cal_flag   ; Check if it overflowed
        INCB    TIMER1_OVRFLW_CNT               ; Inc count of TIMER1 overflow
        ANDB    IOS1_IMAGE, #11011111B          ; Clear TIMER1 overflow bit
chk_Y_cal_flag:
        EI
        BBC     FLAGSET1, 6, set_up_next_ROLL_conv ; Check if done w/ YAW gyro ca
        CMPB    TIMER1_OVRFLW_CNT, #5           ; Check if still time for gyro
        BC      default_YAW_value               ; Skip if not enough time LDB     RAW_AD_VALUE_lo, AD_RESULT_lo   ; Get A/D value
        LDB     RAW_AD_VALUE_hi, AD_RESULT_hi
        SHR     RAW_AD_VALUE, #6                ; Shift out address bits CMP     RAW_AD_VALUE, #434D             ; Check if value is out of
        BNC     chk_done_Y_cal                  ; range, if so then ignore
        CMP     RAW_AD_VALUE, #589D             ; it. (Range +- 6.33 deg.)
        BH      chk_done_Y_cal                  ; s.f. = 0.0818787 deg./bit ADD     Y_CAL_ACC, RAW_AD_VALUE         ; Add this to collection INCB    Y_CAL_CNTR                      ; One more sample
        BR      chk_done_Y_cal default_YAW_value:
        LD      Y_CAL_ACC, #8184D               ; Load default value
        ANDB    FLAGSET1, #10111111B            ; Clear YAW cal bit chk_done_Y_cal:
        CMPB    Y_CAL_CNTR, #16D                ; Check for last value
        BC      cal_YAW                         ; (Branch if not last value)
        BBS     FLAGSET1, 6, set_up_next_ROLL_conv ; Check if done w/ YAW cal ;   *********  Execute below when 16 samples have been collected   ******

;;;;;;;;    Recalculate YAW gyro filter intermediates   ;;;;;;;;;;;;;;;
                                                                ;
cal_YAW:
        ANDB    FLAGSET1, #10111111B            ; Clear YAW cal bit
        SHR     Y_CAL_ACC, #1                   ; Recalculate YGDU1_OUT    ;
        MULU    YGDU1_OUT, Y_CAL_ACC, #37413D   ;                          ;

LD      YGDU2_OUT, YGDU1_OUT            ; Recalculate              ;
        LD      YGDU2_OUT+2, YGDU1_OUT+2        ;     YGDU2_OUT            ;
        SHLL    YGDU2_OUT, #3                   ;                          ;
        MULU    YGDU2_OUT, YGDU2_OUT+2, #55910D ;                          ;
                                                                           ;
        LD      YGDU3_OUT, YGDU2_OUT            ; Recalculate              ;
        LD      YGDU3_OUT+2, YGDU2_OUT+2        ;     YGDU3_OUT            ;
        SHLL    YGDU3_OUT, #1                   ;                          ;
        MULU    YGDU3_OUT, YGDU3_OUT+2, #46917D ;                          ;
```

```
;;;;;;;;  Set up the next ROLL gyro conversion  ;;;;;;;;;;;;;;;;;;;
                                                                  ;
set_up_next_ROLL_conv:
        BBS     IOS0, 6, set_up_next_ROLL_conv   ; Loop until CAM is free  ;
                                                                           ;
        LDB     AD_COMMAND, #00000010B           ; Pgrm. A/D for roll gyro ;
        LDB     HSO_COMMAND, #00011111B          ; Command to start A/D    ;

; the gyro filters and center values initialized for an average gyro and
; gyro circuit combination.
;
; The routine then sends an up and right steering command to the flippers.
;
; Finally, the routine sets the balance lines to zero volts (no balance error.)
; and sets the first motion bit.
;
;;;;;;;;;;;;;;;;;;;;;;;;;;;;;;;;;;;;;;;;;;;;;;;;;;;;;;;;;;;;;;;;;;;;;;;;;;

CVAC_First_motion:                       ; First motion detected
                DI                               ; Disable interrupts First_motion_detected:
                LDB     HSI_MODE, #11101011B     ; Change HSI.3 to interrupt on
                                                 ; every +- trans.

ANDB    FLAGSET1, #10011111B     ; Clear gyro cal bits to stop gyro
                                                 ; calibration if it has not yet
                                                 ; stopped.

LDB     HSO_COMMAND, #00000111B  ; Command flippers for an initial
                ADD     HSO_TIME, TIMER1, #3D    ; steering command up and right,
                                                 ; P2 and Y3 flippers on.

LDB     BALANCE_IMAGE, #128D     ; Zero error balance value
                CLRB    IOPORT2                  ; Select pitch balance (P2.5)
                ST      BALANCE_IMAGE_WO, BALANCE_PORT ; Init. pitch balance error
                ORB     IOPORT2, #00100000B      ; Select yaw balance (P2.5)
                ST      BALANCE_IMAGE_WO, BALANCE_PORT ; Init. yaw balance error
                ORB     FLAGSET1, #10000000B     ; Set 1st motion bit

EI
                RET

;;;;;;;;;;;;;;;;;;;;;;;;;;;;;;;;;;;;;;;;;;;;;;;;;;;;;;;;;;;;;;;
;                                                              ;
;        Set up pointers for all the interrupts.               ;
;                                                              ;
;;;;;;;;;;;;;;;;;;;;;;;;;;;;;;;;;;;;;;;;;;;;;;;;;;;;;;;;;;;;;;;

CSEG    at      2000H

DCW     error_code

DCW     Roll_Yaw_gyro

DCW     hsi_data_available_ISR
        DCW     error_code

DCW     error_code

DCW     software_timers_ISR

DCW     error_code
        DCW     error_code

;;;;;;;;;;;;;;;;;;;;;;;;;;;;;;;;;;;;;;;;;;;;;;;;;;;;;;;;;;;;;;;;;;;;;;;;
;                                                                      ;
;    Set up software version number and 8097 chip configuration register ;
;                                                                      ;
;;;;;;;;;;;;;;;;;;;;;;;;;;;;;;;;;;;;;;;;;;;;;;;;;;;;;;;;;;;;;;;;;;;;;;;;

CSEG    at      SOFTWARE_VERSION

DCW     VERSION_NUMBER

CSEG    at      CHIP_CONFIG_REG

DCB     11111111B                        ; Set CCR for 16-bit bus, WR
                                                 ; strobe, ALE, no wait states,
                                                 ; and no memory protection.
END
```

Figure 5:
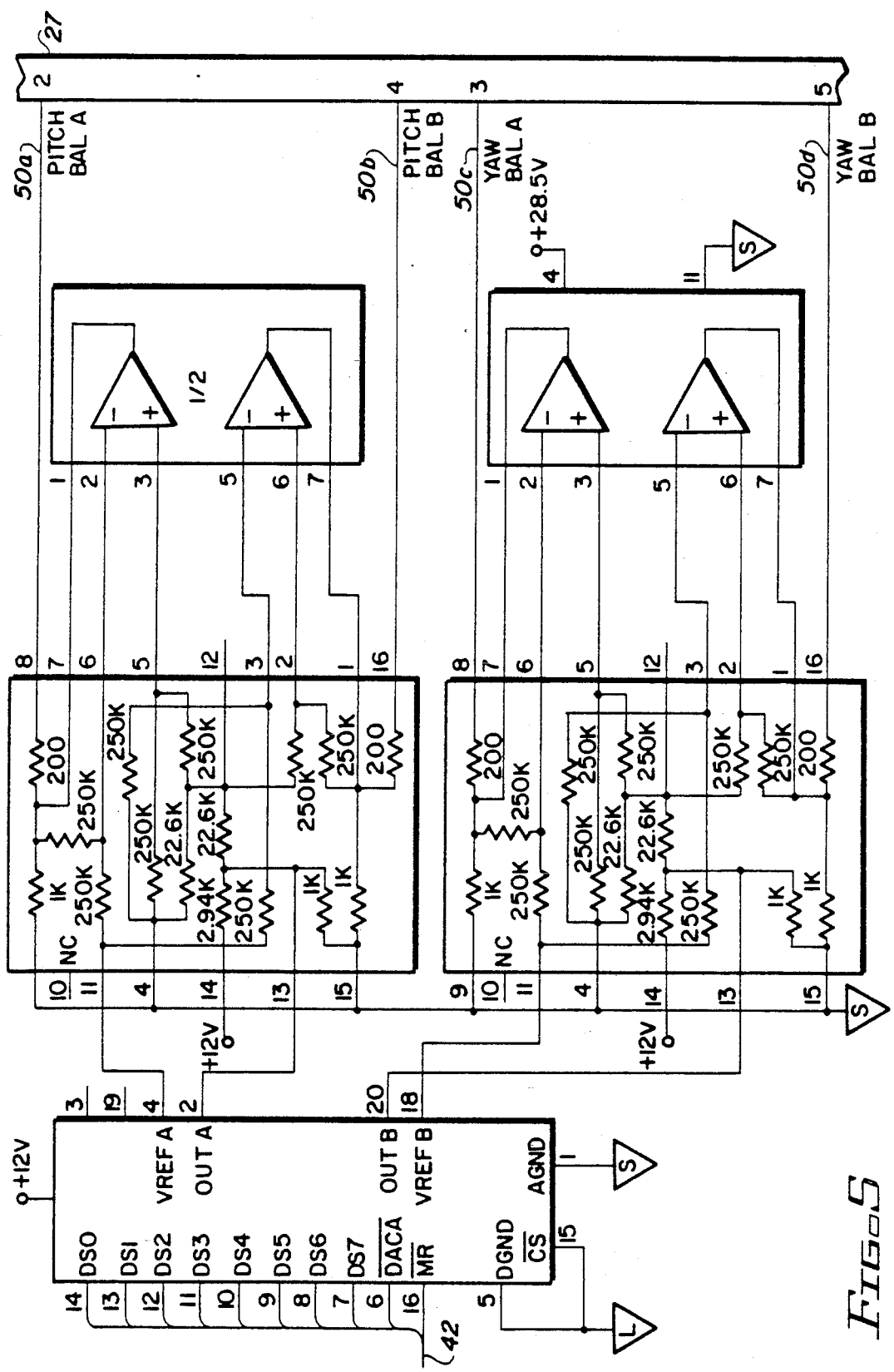
FIG. 5 is an electronic schematic illustrating the handling of the signal used to control pitch and yaw.

FIG. 5 illustrates the preferred embodiment of the circuitry used to take the control signal 42 (originally described in FIG. 4), and generate the various balance signals. This includes the pitch balance-A 50a, pitch balance-B 50b, yaw balance-A 50c, and yaw balance-B 50d. All of these signals connect to connector 27 of the wire harness.

These signals are used for pre-launch alignment of the launcher control signals to the missile electronics. At launch, these wires are severed.

Figure 6:
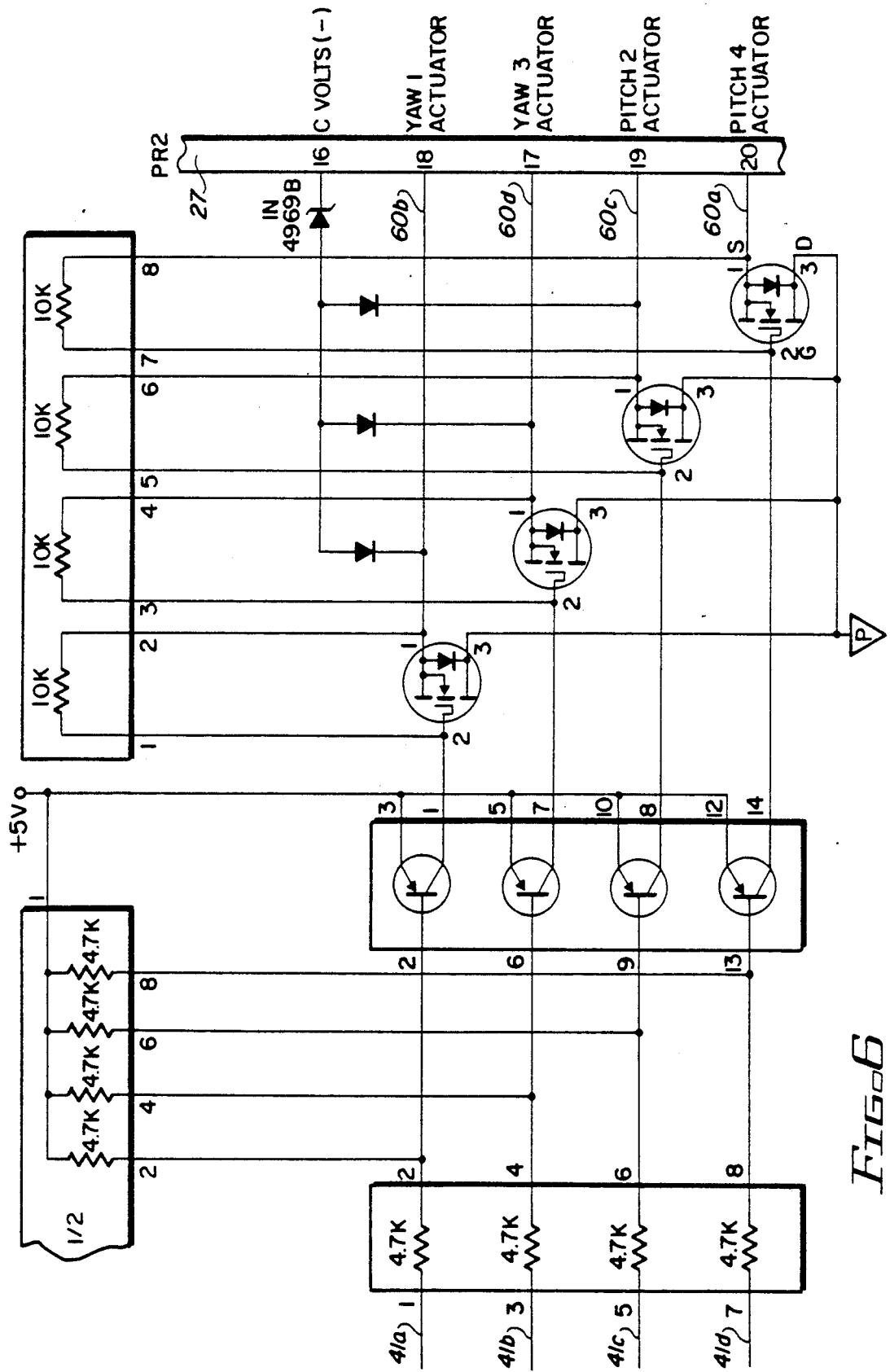
FIG. 6 is an electronic schematic illustrating the handling of the signal used to control pitch and yaw and completing the objectives of the circuitry of FIG. 5.

The remaining control signals, as first described in FIG. 4, are handled by the circuitry shown in FIG. 6.

Control signals 41a, 41b, 41c, and 41d are amplified to generate the pitch 4 actuator signal 60a, the yaw 1 actuator signal 60b, the pitch 2 actuator signal 60c, and the yaw 3 actuator signal 60d. These signals are communicated to the appropriate actuators via connector 27 of the wire harness. As is obvious to those of ordinary skill in the art, these signals are used for the manipulation of the control surfaces for flight control.

Figure 7:
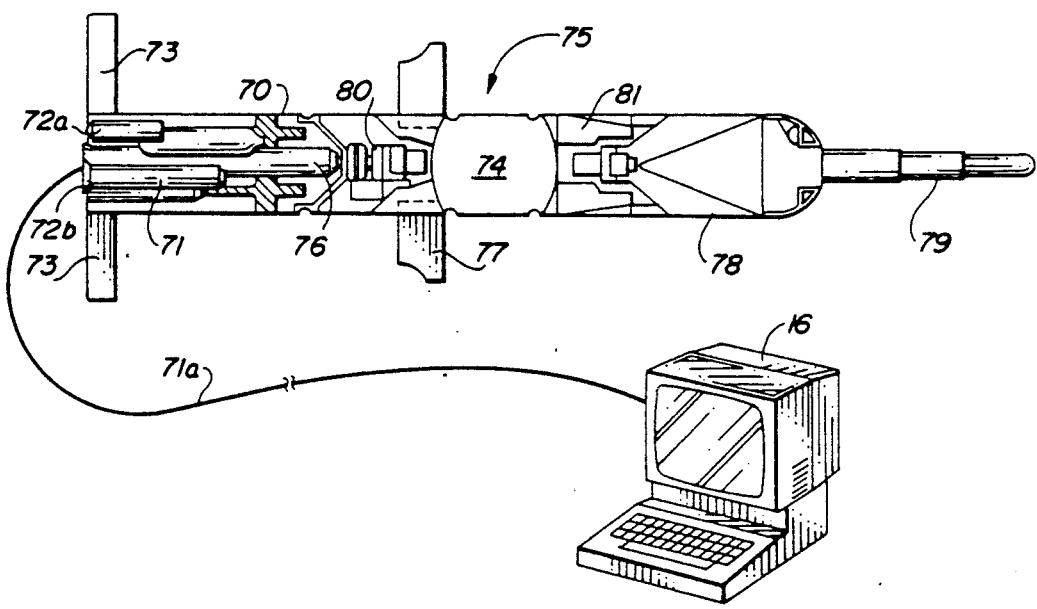
FIG. 7 is a cut-away view of an embodiment of the invention when implemented into a missile and a missile system.

FIG. 7 illustrates the missile and missile system of the preferred embodiment, a tube-launched missile and system.

The missile's components are contained within a body 70 with control surfaces 73. Wings 77 assist the control surfaces 73 in maintaining and directing the missile during flight.

Beacons 72a and 72b assist the operator to visually identifying and track the missile after launch.

Also within missile 75 is the launch motor 76, the warhead 78, the extensible probe 79, flight motor 74, and the launch motor 76. These components are well known in the art and their functions are as their titles indicate.

Permitting the operator interface 16 to communicate with the missile 75 is the communication link, composed of wire dispensers 71 and wire 71a. Wire 71a is a steel wire.

In this manner, the operator communicates directions to the missile 75 via the operator interface 16 and communication link 71 and 71a. The directions from the operator are combined with the positional status of the missile by the electronics unit [not shown] to properly manipulate the control surfaces 73.

It is clear from the forgoing that the present invention creates a superior and more versatile missile.

What is claimed is:

1. A hybrid analog/digital electronics control unit for replacing an analog electronics unit in a tube-launched missile comprising:
   a) positional status means (10) having,
      1) a roll conversion means (10a) for converting a signal from the roll gyro (17) to a roll status signal, and,
      2) a yaw conversion means (10b) for converting a signal from the yaw gyro (18) to a yaw status signal;
   b) directional means (11) being responsive to signals from an operator and for generating a directional pitch signal and a directional yaw signal therefrom;
   c) said positional status means and said directional means being analog; and,
   d) digital control means (12) being responsive to the yaw status signal, the roll status signal, the directional yaw signal, and the directional pitch signal, and for generating therefrom a primary yaw control signal, a secondary yaw control signal, a primary pitch control signal, and a secondary pitch control signal.

2. The digital electronics unit according to claim 1 further comprising:
   a) means for amplifying (13a) said primary yaw control signal;
   b) means for amplifying (13b) said secondary yaw control signal;
   c) means for amplifying (13c) said primary pitch control signal; and,
   d) means for amplifying (13d) said secondary pitch control signal.

3. The digital electronics unit according to claim 2 wherein said digital control means includes means for generating a first motion signal which initiates generation of the primary yaw control signal, the secondary yaw control signal, the primary pitch control signal, and the secondary pitch control signal.

4. The digital electronics control unit according to claim 1 further comprising:
   a) means for amplifying (13a) said primary yaw control signal;
   b) means for amplifying (13b) said secondary yaw control signal;
   c) means for amplifying (13c) said primary pitch control signal; and,
   d) means for amplifying (13d) said secondary pitch control signal.

5. A missile being guidable by operator generated signals comprising:
   a) a body portion (70) having,
      1) a first pitch control surface (73),
      2) a second pitch control surface,
      3) a first yaw control surface, and,
      4) a second yaw control surface;
   b) a flight motor (74) located within said body portion for propelling said body portion;
   c) a gyro system (80) mounted in said body portion and having,
      1) a roll gyro (17) generating a roll gyro signal, and,
      2) a yaw gyro (18) generating a yaw gyro signal; and,
   d) a communication link being a continuous physical connection (71a) between an operator and the missile, for communicating said operator generated signals;
   e) an electronics control unit (81) having,
      1) positional determination means (10) having,
         a) a roll conversion means (10a) for converting the roll gyro signal to a roll status signal, and,
         b) a yaw conversion means (10b) for converting the yaw gyro signal to a yaw status signal,
      2) directional means (11) being responsive to the operator generated signals received via said communication link, for generating therefrom a directional pitch signal and a directional yaw signal, and, 3) digital control means (12) being responsive to the yaw status signal, the roll status signal, the directional yaw signal, and the directional pitch signal, for generating therefrom a primary yaw control signal, a secondary yaw control signal, a primary pitch control signal, and a secondary pitch control signal, 4) amplification means (13) having,
   a) means for amplifying (13a) said primary yaw control signal to an amplified primary yaw control signal,
   b) means for amplifying (13b) said secondary yaw control signal to an amplified secondary yaw control signal,
   c) means for amplifying (13c) said primary pitch control signal to an amplified primary pitch control signal, and,
   d) means for amplifying (13d) said secondary pitch control signal to an amplified secondary pitch control signal; and, f) means for manipulating the control surfaces having,
   1) a first actuator (19a) being responsive to said amplified primary yaw signal for physical movement of said first yaw control surface,
   2) a second actuator (19b) being responsive to said amplified primary pitch signal for physical movement of said first pitch control surface,
   3) a third actuator (19c) being responsive to said amplified secondary yaw signal for physical movement of said second yaw control surface, and,
   4) a fourth actuator (19d) being responsive to said amplified secondary pitch signal for physical movement of said second pitch control surface.

6. The missile according to claim 5 wherein said digital control means includes means for generating a first motion signal which iniitates generation of the primary yaw control signal, the secondary yaw control signal, the primary pitch control signal, and the secondary pitch control signal.

7. An enhanced missile system comprising:
A) an operator input device (16) for generating operator generated signals; and,
B) a missile having,
   1) a body portion (70) having,
      a) a first pitch control surface (73),
      b) a second pitch control surface,
      c) a first yaw control surface, and,
      d) a second yaw control surface,
   2) a flight motor (74) located within said body portion and for propelling said body portion,
   3) a gyro system (80) mounted in said body portion and having,
      a) a roll gyro (17) generating a roll gyro signal, and,
      b) a yaw gyro (18) generating a yaw gyro signal;
   4) a communication link (71a) being a continuous physical connection between the operator input device and the missile for communicating said operator generated signals to the missile,
   5) an electronics control unit (81) having,
      a) positional status determination means (10) having,
         1) a roll conversion means (10a) for converting the roll gyro signal to a roll status signal, and,
         2) a yaw conversion means (10b) for converting the yaw gyro signal to a yaw status signal,
      b) directional means (11) being responsive to the operator generated signals received via said communication link for generating therefrom a directional pitch signal and a directional yaw signal, and,
      c) digital control means (12) being responsive to the yaw status signal, the roll status signal, the directional yaw signal, and the directional pitch signal, for generating therefrom a primary yaw control signal, a secondary yaw control signal, a primary pitch control signal, and, a secondary pitch control signal,
      d) amplification means (13) having,
         1) means for amplifying (13a) said primary yaw control signal to an amplified primary yaw control signal,
         2) means for amplifying (13b) said secondary yaw control signal to a secondary yaw control signal,
         3) means for amplifying (13c) said primary pitch control signal to an amplified primary pitch control signal, and,
         4) means for amplifying (13d) said secondary pitch control signal to an amplified secondary pitch control signal, and,
      6) means for manipulating the control surfaces having,
         a) a first actuator (19a) being responsive to said amplified primary yaw signal for physical movement of said first yaw control surface,
         b) a second actuator (19b) being responsive to said amplified primary pitch signal for physical movement of said first pitch control surface,
         c) a third actuator (19c) being responsive to said amplified secondary yaw signal for physical movement of said second yaw control surface, and,
         d) a fourth actuator (19d) being responsive to said amplified secondary pitch signal for physical movement of said second pitch control surface.

8. The enhanced missile system according to claim 7 wherein said digital control means includes means for generating a first motion signal which initiates generation of the primary yaw control signal, the secondary yaw control signal, the primary pitch control signal, and the secondary pitch control signal.

* * * * *